United States Patent [19]
Shibahata et al.

[11] Patent Number: 5,496,055
[45] Date of Patent: Mar. 5, 1996

[54] SUSPENSION SYSTEM FOR STEERED WHEEL

[75] Inventors: Yasuji Shibahata; Kiyoshi Nakajima, both of Wako, Japan

[73] Assignee: Honda Giken Kogyo Kabushiki Kaisha, Tokyo, Japan

[21] Appl. No.: 53,109

[22] Filed: Apr. 26, 1993

[30] Foreign Application Priority Data

| Apr. 28, 1992 | [JP] | Japan | 4-110373 |
| Aug. 11, 1992 | [JP] | Japan | 4-213915 |
| Jan. 19, 1993 | [JP] | Japan | 5-007004 |

[51] Int. Cl.$^6$ .................................................. B60G 3/26
[52] U.S. Cl. .................... 280/665; 267/188; 280/660; 280/662; 280/675; 280/695
[58] Field of Search ........................... 280/665, 660, 280/662, 663, 673, 675, 689, 695; 267/188

[56] References Cited

U.S. PATENT DOCUMENTS

| 4,202,563 | 5/1980 | Tattermusch | 280/665 |
| 4,556,238 | 12/1985 | Matschinsky | 280/673 |
| 4,881,752 | 11/1989 | Tanaka | 280/675 |
| 5,048,858 | 9/1991 | Luger | 280/660 |
| 5,335,933 | 8/1994 | Yamamoto et al. | 280/675 |

FOREIGN PATENT DOCUMENTS

| 37608 | 6/1989 | Japan . |
| 3276812 | 3/1990 | Japan . |

*Primary Examiner*—Eric D. Culbreth
*Attorney, Agent, or Firm*—Weiner, Carrier & Burt; Joseph P. Carrier; Irving M. Weiner

[57] ABSTRACT

A suspension system for a steered wheel includes a knuckle for steerably supporting the steered wheel about a king pin axis, and upper and lower arms pivotally supported on a vehicle body and connected at free ends thereof to upper and lower portions of the knuckle, respectively. This suspension system further includes a link mechanism which includes a first substantially vertically extending rod connected to the knuckle at a location more inward of the vehicle body than the king pin axis, and a second rod connected at one end to the first rod and at the other end to at least one of the vehicle body and the lower arm. A resilient device is connected to the link mechanism and adapted to exhibit a resilient force repulsive to the deformation of the link mechanism. Thus, even if the king pin offset is set at a small value, a restoring torque can be sufficiently insured in the steering device when steering through a large steering angle at a low speed.

28 Claims, 21 Drawing Sheets

(DURING STRAIGHT TRAVELLING)

(DURING LEFTWARD STEERING)

(DURING STRAIGHT TRAVELLING)

(DURING LEFTWARD STEERING)

SUSPENSION SYSTEM FOR STEERED WHEEL

BACKGROUND OF THE INVENTION

FIELD OF THE INVENTION

The field of the present invention relates to a suspension system for a steered wheel of an automobile, and particularly, to an improvement of a suspension system for a steered wheel, comprising a knuckle for steerably supporting the steered wheel about a king pin axis, and upper and lower arms pivotally supported on a vehicle body and connected at free ends thereof to upper and lower portions of the knuckle, respectively.

DESCRIPTION OF THE RELEVANT ART

Such suspension systems for a steered wheel are already known, as disclosed, for example, in Japanese Patent Application Laid-open No. 7608/91.

To reduce the torque steering phenomenon significant in a front engine front wheel drive vehicle, it is desirable to reduce, as much as possible, the king pin offset, i.e., a distance between a point at which the king pin axis intersects a road surface and the center of a grounded surface of a wheel, as viewed from the front of the vehicle body. However, the restoring torque of a steering device when steering through a large steering angle at a low speed of the vehicle is proportional to the king pin offset. For this reason, if the king pin offset is set at a reduced value in the above manner, the restoring torque of the steering device when steering through the large steering angle at the low vehicle speed is liable to be deficient.

There has also been proposed suspension system for a steered wheel, wherein a restoring torque is applied to a steering device by deforming a stabilizer in operative association with the steering device (see Japanese Patent Application Laid-open No. 276812/91).

Such previously proposed suspension system for a steered wheel comprises a ball joint 01 provided on a turnable member (i.e., a strut) steered about a king pin axis K, and a ball joint 03 provided on an arm portion 02$_1$ of the stabilizer 02, as shown in FIGS. 4A to 4C. The ball joints 01 and 03 are connected to upper and lower ends of a vertically extending pull link (i.e., a connecting rod) 04, respectively. The ball joint 01 with the upper end of the pull link 04 connected thereto is provided at a location offset from the king pin axis K by a distance δ.

If the turnable member is steered leftwardly about the king pin axis, the left ball joint 01 is moved on an arcuate locus, thereby causing the left pull link 04 to be pushed downwardly, so that the arm portion 02$_1$ of the stabilizer 02 connected to the lower end of the pull link 04 through the ball joint 03 is resiliently deformed in a direction of an arrow a in FIG. 4C. As a result, the left pull link 04 is pushed upwardly by a resilient restoring force of a torsion portion 02$_2$ deformed in a twisted manner, thereby generating a restoring torque intended to restore the turnable member to its neutral position. At the same time, the right pull link 04 connected to the right ball joint 01 is pulled upwardly, and the arm 02$_1$ of the stabilizer 02 connected to the lower end of the right pull link 04 is resiliently deformed in a direction of an arrow b in FIG. 4C. As a result, the right pull link 04 is pulled downwardly by the torsion portion 02$_2$ deformed in the twisted manner, thereby generating a restoring torque intended to restore the turnable member to its neutral position. Therefore, even if the restoring torque of the steering device when steering through a large steering angle at a low speed is reduced, as a result of reduction of the king pin offset to reduce the torque steering phenomenon peculiar to a front wheel drive vehicle, a restoring torque can be generated in the steering device by the resilient restoring force of the stabilizer 02.

However, in practice, as shown in FIG. 4C, the right pull link 04 is pulled upwardly and laterally with the steering of the turnable member, thereby causing the right arm portion 02$_1$ of the stabilizer 02 to be pulled horizontally (i.e., in a direction of an arrow c), resulting in a disadvantage that the torsion portion 02$_2$ is not sufficiently deformed in the twisted manner, and hence, no effective restoring torque is generated in the steering device.

SUMMARY OF THE INVENTION

Accordingly, it is an object of the present invention to provide a suspension system for a steered wheel, wherein even if the king pin offset is set at a small value, a restoring torque can be insured in the steering device when steering through a large steering angle at a low speed.

To achieve the above object, according to the present invention, there is provided a suspension system for a steered wheel, comprising: a knuckle for steerably supporting the steered wheel about a king pin axis; upper and lower arms pivotally supported on a vehicle body and connected at free ends thereof to upper and lower portions of said knuckle, respectively; a link mechanism including a first vertically extending rod connected to the knuckle at a location more inward of the vehicle body than said king pin axis, and a second rod connected at one end thereof to said first rod and at the other end to at least one of the vehicle body and the lower arm; and a resilient means connected to said link mechanism for exhibiting resilient force repulsive to the deformation of said link mechanism.

With the above construction, if the knuckle is turned about the king pin axis to steer the wheel by the steering device, a resilient repulsive force is accumulated in the resilient means with movement and deformation of the link mechanism, so that a restoring force can be provided to the steering device by the accumulated resilient repulsive force. Thus, even if the king pin offset and the king pin inclination angle of the wheel are set at small values to prevent the torque steering phenomenon, an appropriate restoring force can be generated in the steering device.

Preferably the resilient means may be comprised of a stabilizer extending laterally of the vehicle body with the stabilizer connected at its free end to the second rod, whereby the movement of the knuckle can be transmitted as a vertical displacement (including no horizontal displacement) to the stabilizer, thereby effectively deforming the stabilizer. As a result, a sufficient restoring force can be exhibited by the stabilizer, thereby providing a sufficient restoring torque to the steering device.

According to another preferred aspect of the invention, the resilient means may be comprised of a damper for damping the vertical movement of the knuckle, with the damper connected at its lower end to the knuckle through the first rod and to at least either one of the vehicle body and the lower arm through the second rod the damper can be compressed through the first rod with the turning movement of the knuckle, so that a restoring force can be provided to the steering device by the restoring force of the compressed damper.

According to still another preferred aspect of the invention, the resilient means may be comprised of a suspension spring, the second rod may be formed into an A-shaped arm such that the other end of the second rod is pivotally supported, at two points, to the vehicle body, and the suspension spring may be supported by the link mechanism. Through such arrangement, the suspension spring can be deformed through the link mechanism with the turning movement of the knuckle, so that a restoring force can be provided to the steering device by the restoring force of the deformed suspension spring. In this case, the rigidity of the link mechanism in the longitudinal direction of the vehicle body is increased by forming the second rod into the A-shaped arm which is supported at the two points, and therefore, the link mechanism can be moved vertically without large deflection in the longitudinal direction of the vehicle body to sufficiently deform the suspension spring.

According to still a further preferred aspect of the invention, the resilient means may be comprised of a suspension spring, the first rod may be formed into an I-shaped arm such that the other end of the second rod is pivotally supported, at one point, to the vehicle body; an end of a restraining arm pivotally supported on the vehicle body may be connected to the I-shaped arm, and the suspension spring may be supported by the link mechanism. With this arrangement the suspension spring can be deformed through the link mechanism with the turning movement of the knuckle, so that a restoring force can be provided to the steering device by the restoring force of the deformed suspension spring. In this case, the rigidity of the link mechanism in the longitudinal direction of the vehicle body is increased by reinforcing the I-shaped arm with the restraining arm and, therefore, the link mechanism can be moved vertically without large deflection in the longitudinal direction of the vehicle body to sufficiently deform the suspension spring.

Accordingly to yet another preferred aspect of the invention the resilient means may be comprised of a suspension spring which is supported at one end on the vehicle body and at the other end on a tip end of the first rod, and the suspension spring can be deformed through the first rod with the turning movement of the knuckle, so that an appropriate restoring force can be provided to the steering device by the restoring force of the deformed suspension spring. At this time, the vertical movement of the first rod, as it is, is transmitted to the suspension spring, so that the suspension spring can de deformed sufficiently.

The above and other objects, features and advantages of the invention will become apparent from the following description of preferred embodiments, taken in conjunction with the accompanying drawings.

DESCRIPTION OF THE PREFERRED EMBODIMENTS

The present invention will now be described by way of several preferred embodiments in connection with the accompanying drawings.

Figure 1:
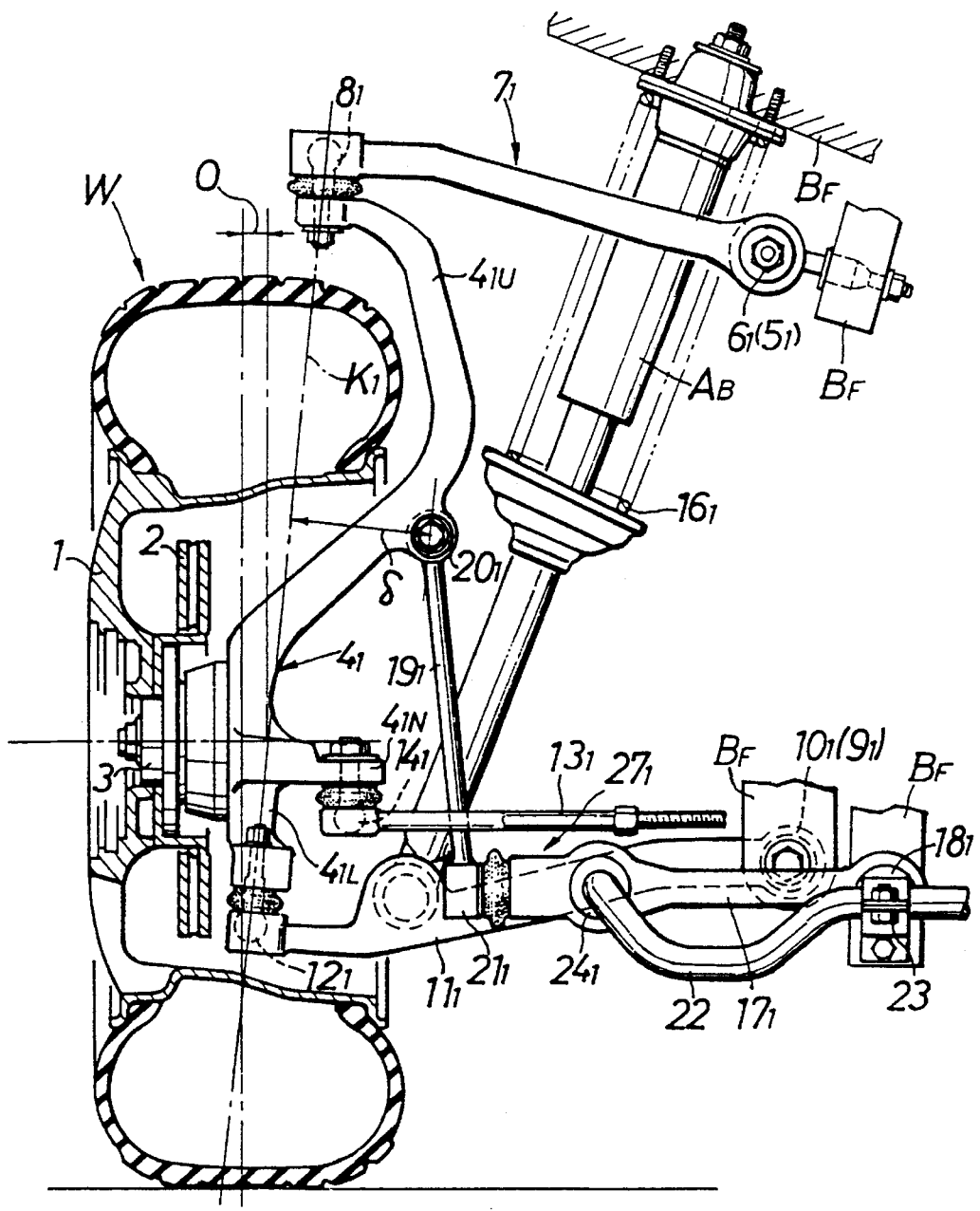
FIG. 1 is a view of a suspension system for a left front wheel of an automobile according to a first embodiment of the present invention, taken from the rear of a vehicle body.
Figure 2:
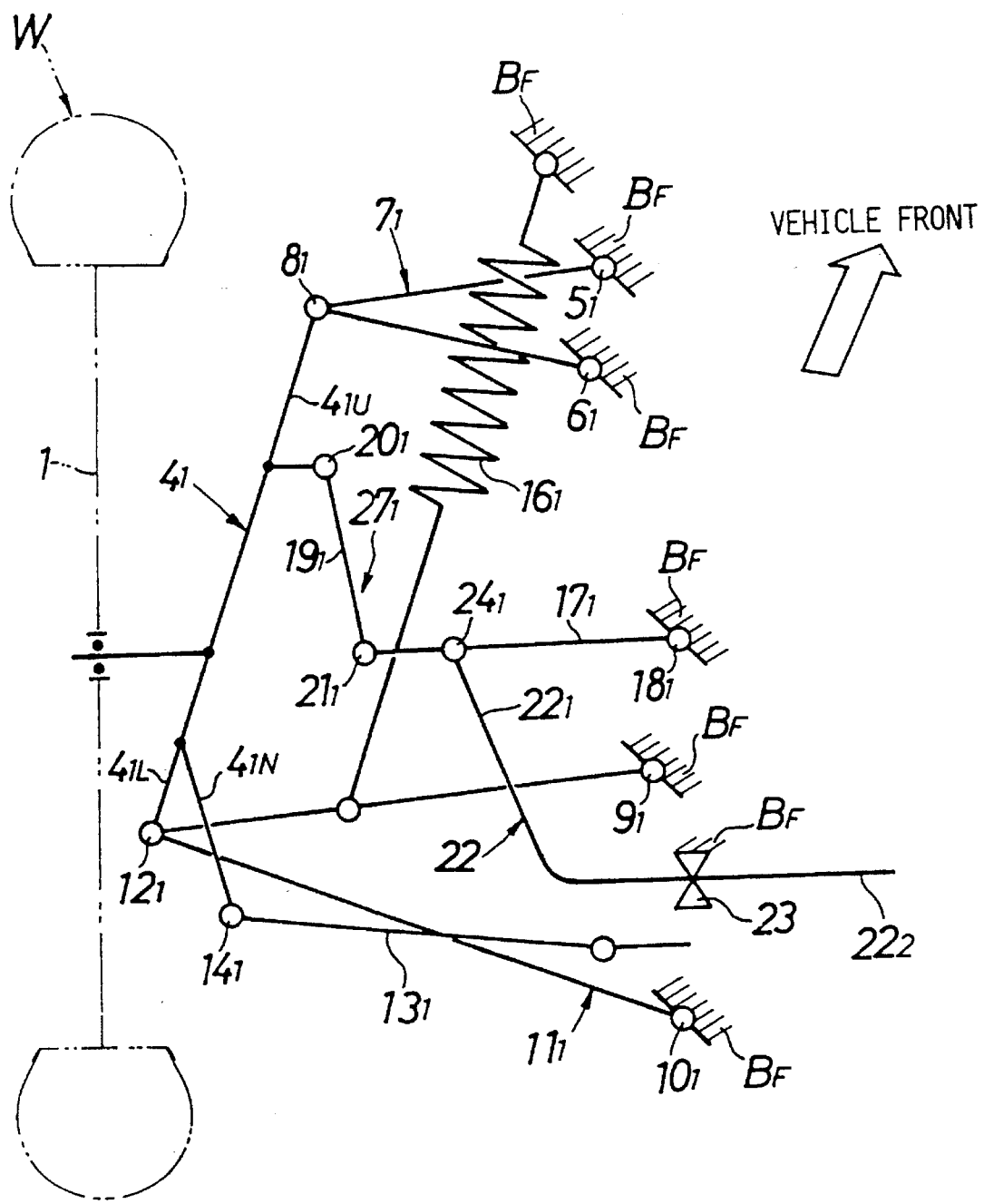
FIG. 2 is a skeleton diagram corresponding to FIG. 1.

FIGS. 1 to 3 illustrate a first embodiment of the present invention. A right front wheel has the same specularly symmetrical structure as a left front wheel and hence, the illustration of the former wheel is omitted.

Referring to FIGS. 1 and 2, a wheel disk I of a steered wheel W (left front wheel) of a front wheel drive vehicle is coupled at its central portion to a wheel hub 3 together with a brake disk 2. The wheel hub 3 is rotatably supported on a knuckle $4_1$ through a ball bearing (not shown).

An upper end of an upper support portion $4_{1u}$ extending upwardly from the knuckle $4_1$ is supported, through a ball joint $8_1$, at a tip end of an A-shaped upper arm $7_1$ which is pivotally supported on a vehicle body frame $B_F$ by means of a pair of rubber bush joints $5_1$ and $6_1$, with their two base end points spaced apart from each other in a longitudinal direction of a vehicle body. A lower end of a lower support portion $4_{1L}$ extending downwardly from the knuckle $4_1$ is supported, through a ball joint $12_1$, at a tip end of an A-shaped lower arm $11_1$ which is also pivotally supported on the vehicle body from $B_F$ by means of a pair of rubber bush joints $9_1$ and $10_1$ with their two base end points spaced apart from each other in the longitudinal direction of the vehicle body. A tie rod $13_1$ adapted to move laterally in operative association with the operation of a steering wheel is connected at its outer end, through a ball joint $14_1$, to a tip end of a steering support portion $4_{1N}$ extending rearwardly of the vehicle body from a lower portion of the knuckle $4_1$. A tip end portion of the lower arm $11_1$ and the vehicle body frame $B_F$ are interconnected by a suspension spring $16_1$ integral with a shock absorber $A_B$.

The knuckle $4_1$ is vertically movably supported on the vehicle body frame $B_F$ with the upper and lower arms $7_1$ and $11_1$ interposed therebetween, so that a vertical external force supplied from a road surface is absorbed by extension and contraction of the suspension spring $16_1$, and a vertical vibration is damped by the shock absorber $A_B$. The knuckle $4_1$ is steered in a transferred manner about the pair of ball joints $8_1$ and $12_1$ together with the steered wheel W by the lateral movement of the tie rod $13_1$.

In the vicinity of the pair of rubber bush joints $9_1$ and $10_1$ for supporting the base end of the lower arm $11_1$ on the vehicle body frame $B_F$ a base end of a lateral link $17_1$ as a second rod extending substantially horizontally in a laterally outward direction of the vehicle body is pivotally supported through a rubber bush joint $18_1$ for vertically swinging movement. A tip end of the lateral link $17_1$ and an intermediate portion of the upper support portion $4_{1u}$ of the knuckle $4_1$ are connected to upper and lower opposite ends of a pull link $19_1$ as a first substantially vertically extending rod through ball joints $20_1$ and $21_1$, respectively. The ball joint $20_1$ is offset by a distance 8 in a laterally inward direction of the vehicle body with respect to a king pin axis $K_1$ (see FIG. 1) which connects the ball joint $8_1$ at the tip end of the upper arm $7_1$ with the ball joint $12_1$ at the tip end of the lower arm $11_1$. Therefore, when the knuckle $4_1$ is turned laterally about the king pin axis $K_1$ by the transferred steering, the ball joint $20_1$ at the upper end of the pull link $19_1$ is moved to describe an arcuate locus (see FIG. 3A). It should be noted that the lateral link $17_1$ and the pull link $19_1$ constitute a link mechanism $27_1$ according to the present invention.

As a result of appropriate setting of the inclination angle of the king pin axis $K_1$, a distance between the king pin axis $K_1$ and the center of a grounded surface of the steered wheel W at a level of a wheel center, i.e., a king pin offset 0 (see FIG. 1) is small, thereby providing a reduction in torque steering phenomenon peculiar to the front wheel drive vehicle.

Figure 3A:
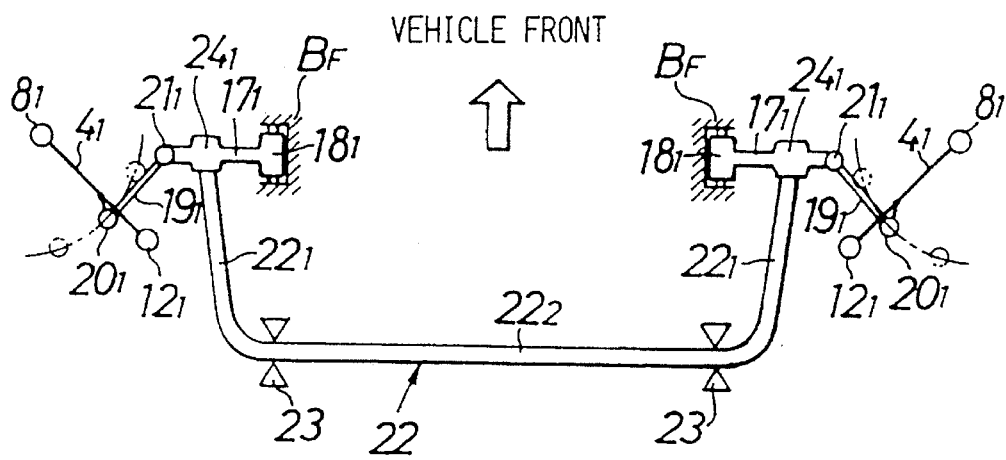
FIG. 3A to 3C are diagrams for explaining the operation of a suspension system, FIG. 3A being a plan diagram, and FIGS. 3B and 3C correspond to views taken from the rear of the vehicle body.
Figure 3B:
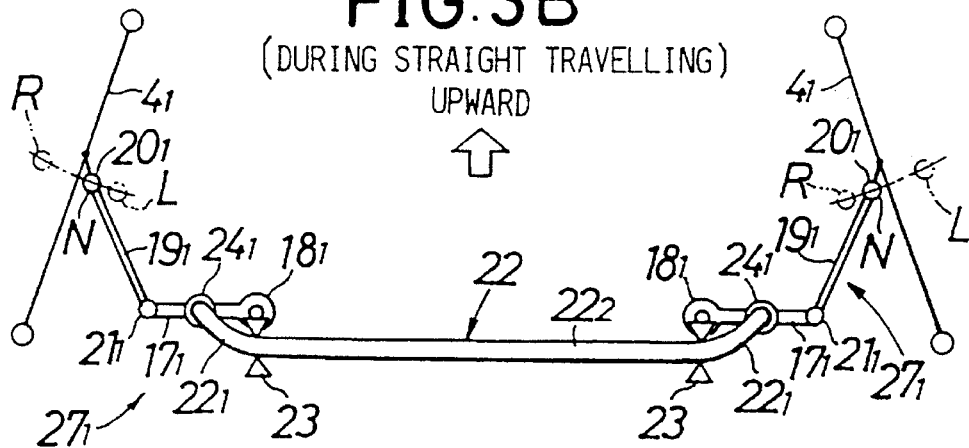

Referring also to FIGS. 3A and 3B, a stabilizer 22 includes a pair of arm portions $22_1, 22_1$ flexed forwardly in positions laterally spaced from each other, and a torsion portion $22_2$ connected at its left and right opposite ends to the arm portions and extending in the lateral direction of the vehicle body. The torsion portion $22_2$ is resiliently supported on the vehicle body frame $B_F$ by two supports 23, 23 and free ends of the arm portions $22_1, 22_1$ are tip end portions connected to the lateral links $17_1, 17_1$ through rubber bush joints $24_1, 24_1$.

The stabilizer 22 does not serve as a torsion bar when the left and right steered wheels W, W are moved vertically in the same phase, but it serves as a torsion bar to increase the roll rigidity of the suspension system when the left and right steered wheels W, W are moved vertically in opposite phases.

The operation of the first embodiment of the present invention having the above-described construction will be described below.

Figure 3C:
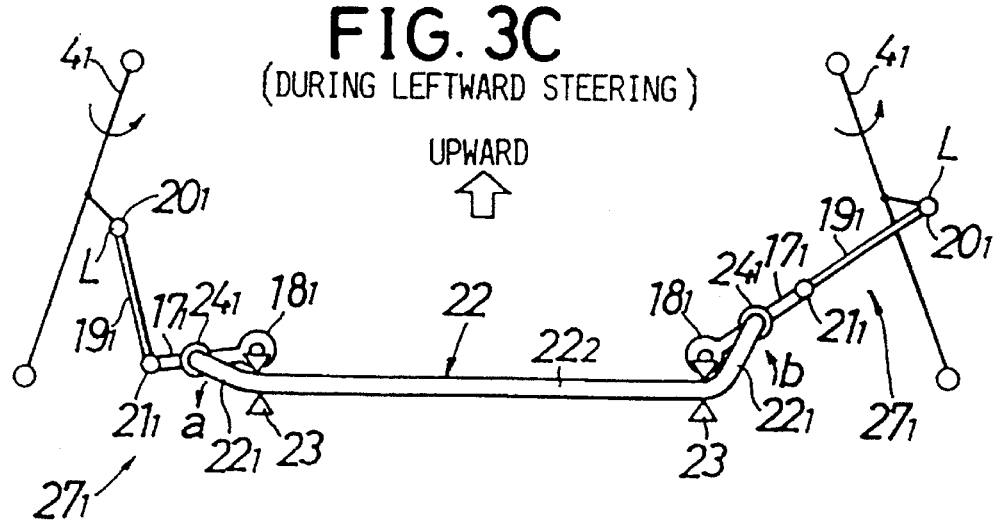
Figure 4A:
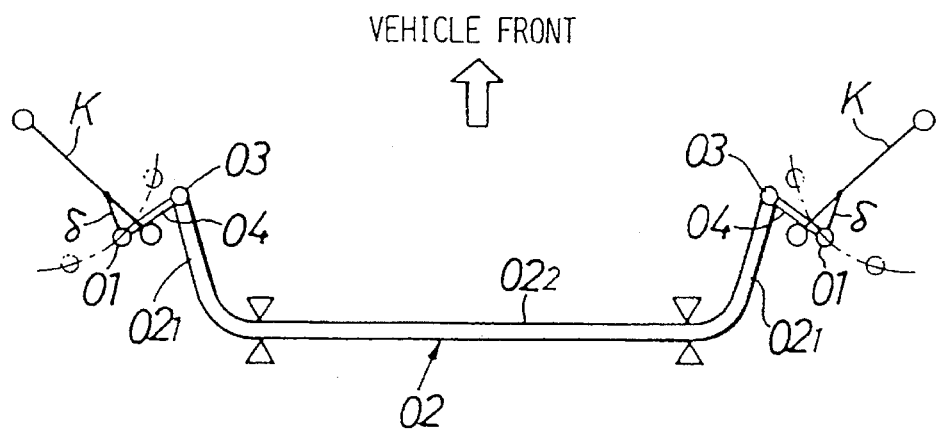
FIG. 4A to 4C are diagrams for explaining the operation of a previously proposed suspension system, FIG. 4A being a plan diagram, and FIGS. 4B and 4C correspond to views taken from the rear of the vehicle body.
Figure 4B:
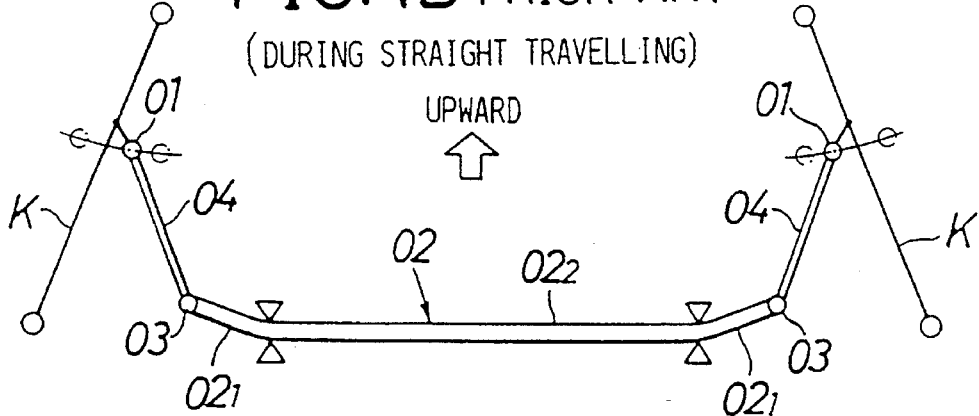
Figure 4C:
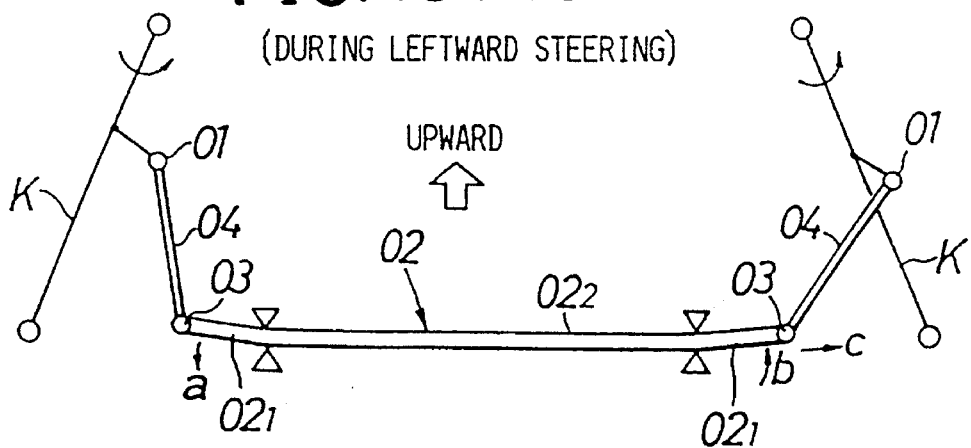

Referring to FIG. 1, when the tie rod $13_1$ is pushed and pulled laterally of the vehicle body by the operation of the steering wheel, the knuckle $4_1$ supporting the steered wheel W is steered laterally about the king pin axis $K_1$ which connects the ball joint $8_1$ at the tip end of the upper arm $7_1$ with the ball joint $12_1$ at the tip end of the lower arm $11_1$. At that time, a restoring torque of the steering device tends to be deficient, particularly when steering through a large steering angle at a low speed, because the king pin offset 0 is set at a small level to reduce the torque steering phenomenon. However, this restoring torque is insured by the present invention in the following manner:

When the steered wheel W is steered, for example, in a leftward direction as viewed in FIG. 3C in order to swing the vehicle, each of the ball joints $20_1$ provided on the upper support portions $4_{1U}$ of the left and right knuckles $4_1$ is moved about the king pin axis $K_1$ from an N position (neutral position) to an L position (left steered position) to describe an arcuate locus. This causes the left lateral link $17_1$ to be pushed down in a direction of an arrow a about the rubber bush joint $18_1$ by the pull link $19_1$ connected to the ball joint $20_1$ (see FIG. 3C). As a result, the torsion portion $22_2$ of the stabilizer 22 with the arm portions $22_1, 22_1$ connected to the left and right lateral links $17_1, 17_1$ is twisted at its opposite ends in opposite directions, and is resiliently deformed.

When the stabilizer $21_2$ is resiliently deformed in this manner, a restoring force thereof allows the knuckle $4_1$ and thus the steered wheel W to be biased toward the neutral position (N position) and hence, a restoring torque can be generated in the steering device. At that time, the movement of the left and right pull links $19_1, 19_1$ is transmitted as a vertical displacement to the arm portions $22_1, 22_1$ of the stabilizer 22, while being restrained by the lateral links $17_1, 17_1$ which are pivotally supported on the vehicle body frame $B_F$, so that only the vertical swinging movement thereof is permitted. Thus, the torsion portion $22_2$ of the stabilizer 22 can be effectively deformed to generate a sufficient restoring force. Therefore, the stabilizer 22 corresponds to a resilient means in this embodiment of the present invention.

When the steered wheel W is steered in the reverse direction, i.e., in a rightward direction, each of the ball joints $20_1$ provided on the upper support portions $4_{1U}$ of the left and right knuckles $4_1$ is moved about the king pin axis $K_1$ from the N position (neutral position) to an R position (right steered position) to describe an arcuate locus. This causes the left and right lateral links $17_1$ to be swung in the reverse direction from that described above to deform the torsion portion $22_2$ of the stabilizer 22 in a twisting manner, so that a restoring torque can be generated in the steering device.

In the first embodiment of the present invention as shown, the stabilizer 22 is disposed on a rear side of the vehicle body with respect to the lateral link $17_1$. Alternatively, the stabilizer 22 may be disposed, for example, on a front side of the vehicle body. In addition, the lateral link $17_1$ can be pivotally supported in the vicinity of the base end of the lower arm $11_1$, instead of being pivotally supported on the vehicle body frame $B_F$. Further, the pull link $19_1$ can be connected at its lower end to the knuckle $4_1$ and at its upper end to the lateral link $17_1$ by vertically reversing the pull link $19_1$.

Figure 5:
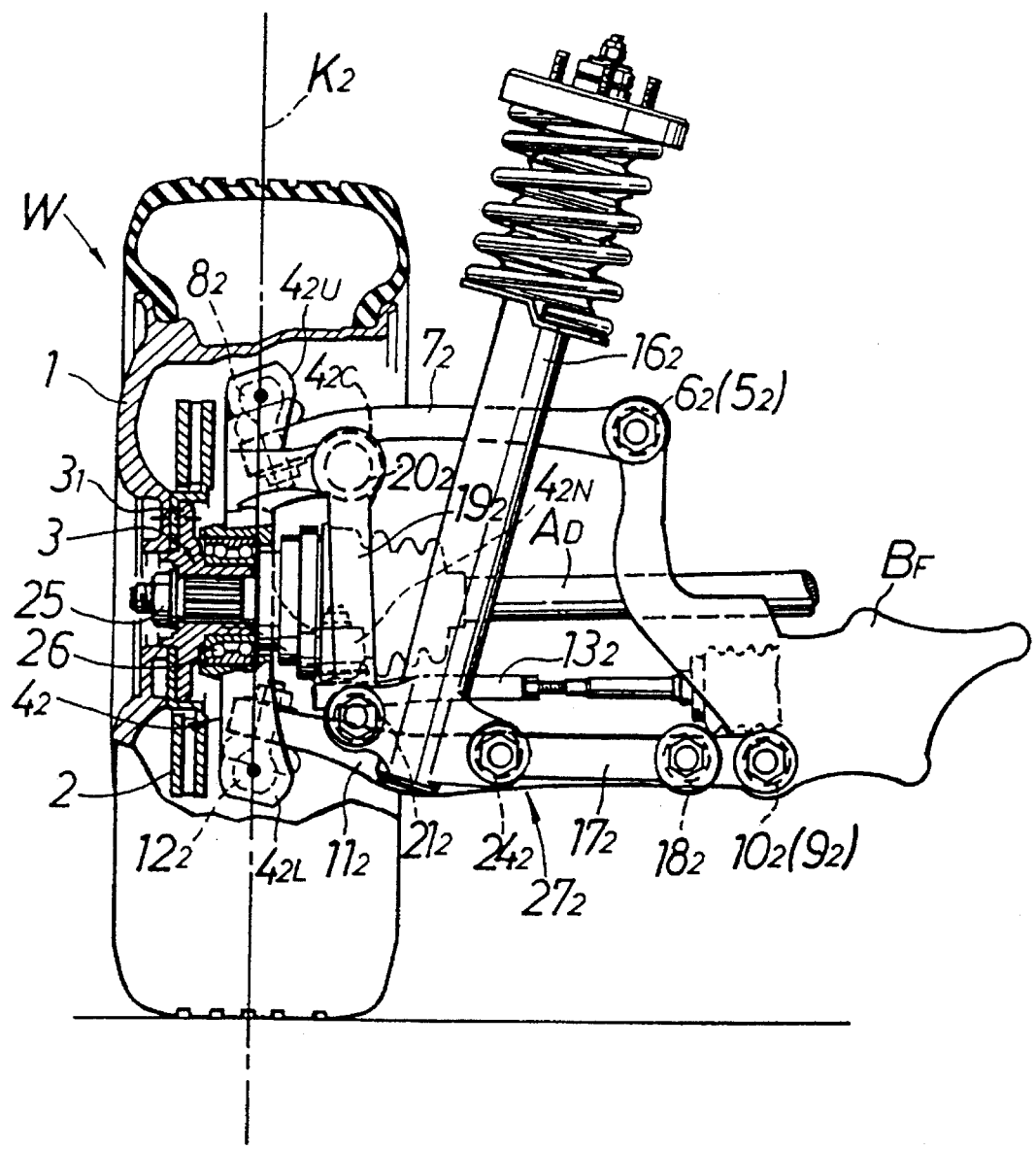
FIG. 5 is a view of a suspension system for a left front wheel of an automobile according to a second embodiment of the invention, taken from the rear of a vehicle body.
Figure 6:
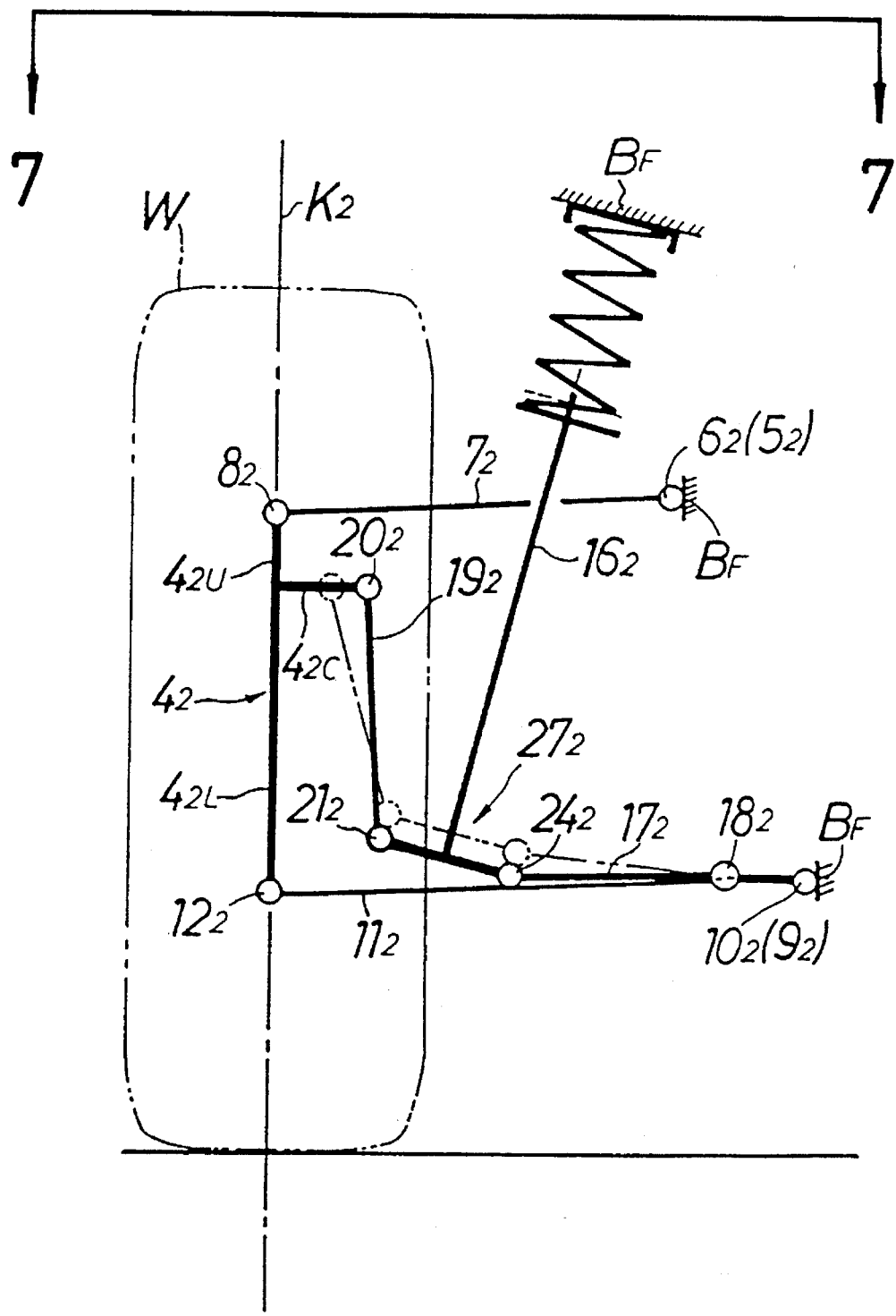
FIG. 6 is a diagram corresponding to FIG. 5 for explaining its operation.
Figure 7:
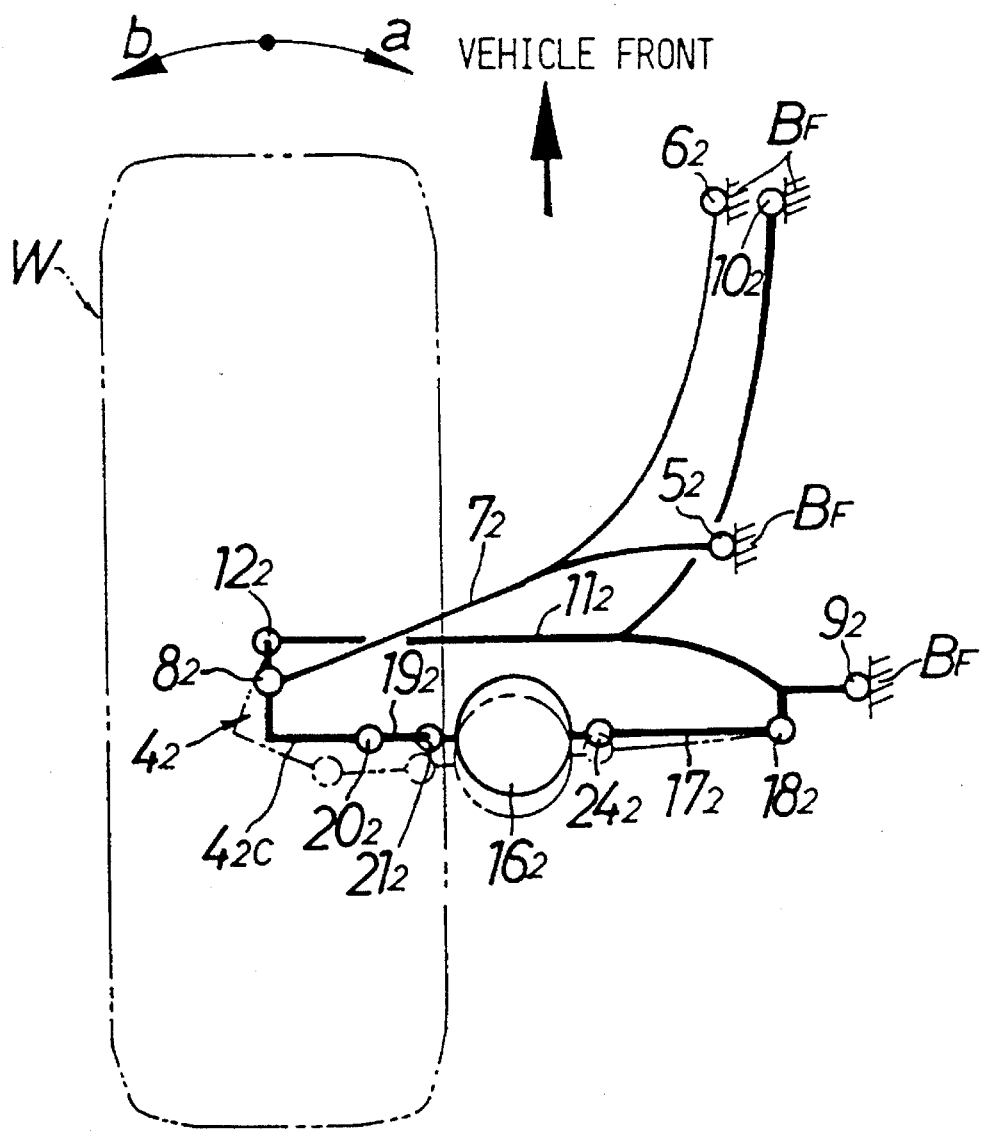
FIG. 7 is a diagram taken in a direction of line 7—7 in FIG. 6.

FIGS. 5 to 7 illustrate a second embodiment of the present invention. In this second embodiment, the present invention is applied to a case where both of the king pin offset and the king pin inclination angle are set to be zero, unlike the first embodiment. However, it will be understood that the king pin offset and the king pin inclination angle are not strictly limited to zero according to this embodiment.

As shown in FIGS. 5 to 7 a wheel hub 3 is spline-connected to an outer end of a wheel driving axle $A_D$ driven by a power unit (not shown) and is secured thereto by a nut 25. A wheel disk 1 and a brake disk 2 in a wheel W are commonly clamped to a flange $3_1$ of the wheel hub 3.

Integrally formed on a knuckle $4_2$ supported around an outer periphery of the wheel hub 3 with a ball bearing 26 interposed therebetween are a downwardly extending lower support portion $4_{2L}$, an upwardly extending upper support portion $4_{2U}$, steering support portion $4_{2N}$ extending forwardly of the vehicle body, and a controlling support portion $4_{2C}$ extending inwardly of the vehicle body from an intermediate portion of the upper portion $4_{2U}$. A lower arm $11_2$ supporting a lower portion of the knuckle $4_2$ is pivotally supported at its bifurcated base end on the vehicle body frame $B_F$ through a pair of rubber bush joints $9_2$ and $10_2$, and is pivotally supported at its tip end on the lower support portion $4_{2L}$ of the knuckle $4_2$ through a ball joint $12_2$. An upper arm $7_2$ supporting an upper portion of the knuckle $4_2$ is pivotally supported at its bifurcated base end on the vehicle body frame $B_F$ through rubber bush joints $5_2$ and $6_2$ and is pivotally supported at its tip end on the upper support portion $4_{2U}$ of the knuckle $4_2$ through a ball joint $8_2$. The knuckle $4_2$ is vertically movably supported on the vehicle body frame $B_F$ through the lower arm $11_2$ and the upper arm $7_2$. In the structure of the second embodiment a king pin axis $K_2$ connecting the ball joint $12_2$ at the lower support portion $4_{2L}$ of the knuckle $4_2$ with the ball joint $8_2$ at the upper support portion $4_{2U}$ is located in a rotational plane of the steered wheel W and hence, both of the king pin offset and the king pin inclination angle of the steered wheel W are set to be zero.

The steering support portion $4_{2N}$ of the knuckle $4_2$ is connected to a steering wheel (not shown) through a tie rod $13_2$, whereby the knuckle $4_2$ is permitted to be rotated leftwardly and rightwardly about the king pin axis $K_2$ to steer the steered wheel W.

A damper $16_2$ suspending the steered wheel W is connected at its upper end to the vehicle body frame $B_F$ and at its lower end to the knuckle $4_2$ and the lower arm $11_2$ through two rods $19_2$ and $17_2$. More specifically, a ball joint $20_2$ provided at the controlling support portion $4_{2C}$ of the knuckle $4_2$ and a rubber bush joint $21_2$ provided at the lower end of the damper $16_2$ are interconnected by the first rod $19_2$ disposed substantially vertically, and a rubber bush joint $18_2$ provided in the vicinity of the base end of the lower arm $11_2$ and a rubber bush joint $24_2$ provided at the lower end of the damper $16_2$ are interconnected by the second rod $17_2$ disposed substantially horizontally. With such structure the position of the ball joint $20_2$ connecting the controlling support portion $4_{2C}$ of the knuckle $4_2$ with the first rod $19_2$ is offset inwardly of the vehicle body from the king pin axis $K_2$, as clearly shown in FIG. 6 and 7, and is also offset rearwardly of the vehicle body from the center of the steered wheel W, as can be seen from FIG. 7. It is noted here that the first rod $19_2$ and the second rod $17_2$ constitute a link mechanism $27_2$ of the present invention through a lower end of the damper $16_2$.

The operation of the second embodiment of the present invention having the above-described construction will be described below.

As is apparent from FIGS. 5 and 6, since the king pin axis $K_2$ connecting the ball joint $12_2$ at the lower support portion of the knuckle $4_2$ and the ball joint $8_2$ at the upper support portion $4_{2U}$ lies within a vertical plane passing the center of the steered wheel W, both of the king pin offset and the king pin inclination angle of the steered wheel W are set to be zero. Therefore, even if a torque is transmitted from the steered wheel as a driven wheel to a road surface, the generation of a so-called torque steering phenomenon (through which the steered wheel W is steered in an undesired direction by such torque) is prevented.

In general, however, if both of the king pin offset and the king pin inclination angle of the steered wheel W are set to be zero, the restoring torque of the steering device tends to be deficient when the tie rod $13_2$ is pushed and pulled to steer the steered wheel W laterally. This tendency is significant, particularly when steering through a large steering angle at a low speed. With the suspension system of the second embodiment, however, sufficient restoring torque of the steering service can be generated in the following manner:

When the lefthand steered wheel W which is an outer wheel during a turning operation of the vehicle is steered in a direction of an arrow a in FIG. 7 to swing the vehicle, for example, in a rightward direction, the knuckle $4_2$ is rotated clockwise about the king pin axis $K_2$, so that the ball joint $20_2$ provided on the controlling support portion $4_{2C}$ projecting inwardly of the vehicle body from the king pin axis $K_2$ is displaced rearwardly and outwardly of the vehicle body, as shown by a dashed line in FIGS. 6 and 7. As a result, the lower end of the damper $16_2$ is pulled upwardly by the first rod $19_2$ which connects the ball joint $20_2$ on the controlling support portion $4_{2C}$ with the rubber bush joint $21_2$ on the damper $16_2$, and the damper $16_2$ is slightly compressed. If the damper $16_2$ is compressed in this manner, the steered wheel W is biased, by the steering device, toward the neutral position before the steering operation is complete and therefore, sufficient restoring torque can be generated in the steering device. Thus, the damper $16_2$ corresponds to a resilient means in the second embodiment of the present invention.

When the steered wheel W which is an inner wheel during a turning operation of the vehicle is steered in a direction of an arrow b in FIG. 7 to swing the vehicle in the opposite direction, i.e., in a leftward direction, the ball joint $20_2$ is displaced forwardly of the vehicle body and also slightly inwardly of the vehicle. However, such displacement of the ball joint $20_2$ causes the first rod $19_2$ to move little vertically and consequently, substantially no expansion and contraction of the damper $16_2$ is performed.

Thus, when the steered wheel is steered to turn the vehicle, the restoring torque is generated in the steered wheel W which is the outer wheel during a turning operation of the vehicle, but such restoring torque is not generated in the steered wheel which is the inner wheel during the turning operation. However, a large load is applied to the outer wheel by a centrifugal force applied to the vehicle during the turning operation, whereas only a small load is applied to the inner wheel. Therefore, the restoring torque generated in the outer wheel acts effectively, and in general, it is possible to apply a sufficient restoring torque to the steering device.

In the above-described second embodiment, the controlling support portion $4_{2C}$ of the knuckle $4_2$, the first rod $19_2$, the damper $16_2$ and the second rod $17_2$ are offset rearwardly of the vehicle body from the center of the steered wheel W in order to avoid the interference with the wheel drive shaft $A_D$. In a rear wheel drive vehicle having no wheel drive shaft $A_D$, however, these components can be disposed at the longitudinal center of the steered wheel. If they are disposed in this manner, the damper $16_2$ can be compressed through the first rod $19_2$ regardless of whether the associated steered wheel W is the outer wheel or the inner wheel, and regardless of whether the steered wheel W is steered in either of the leftward and rightward directions. Therefore, it is possible to generate a restoring torque in both of the outer and inner wheels during the turning operation.

In place of provision of the rubber bush joint $18_2$ on the lower arm $11_2$, the rubber bush joint $18_2$ may be provided on the vehicle body frame $B_F$. In this case, it is desirable to use a ball joint, because the swinging angle is larger.

Figure 8:
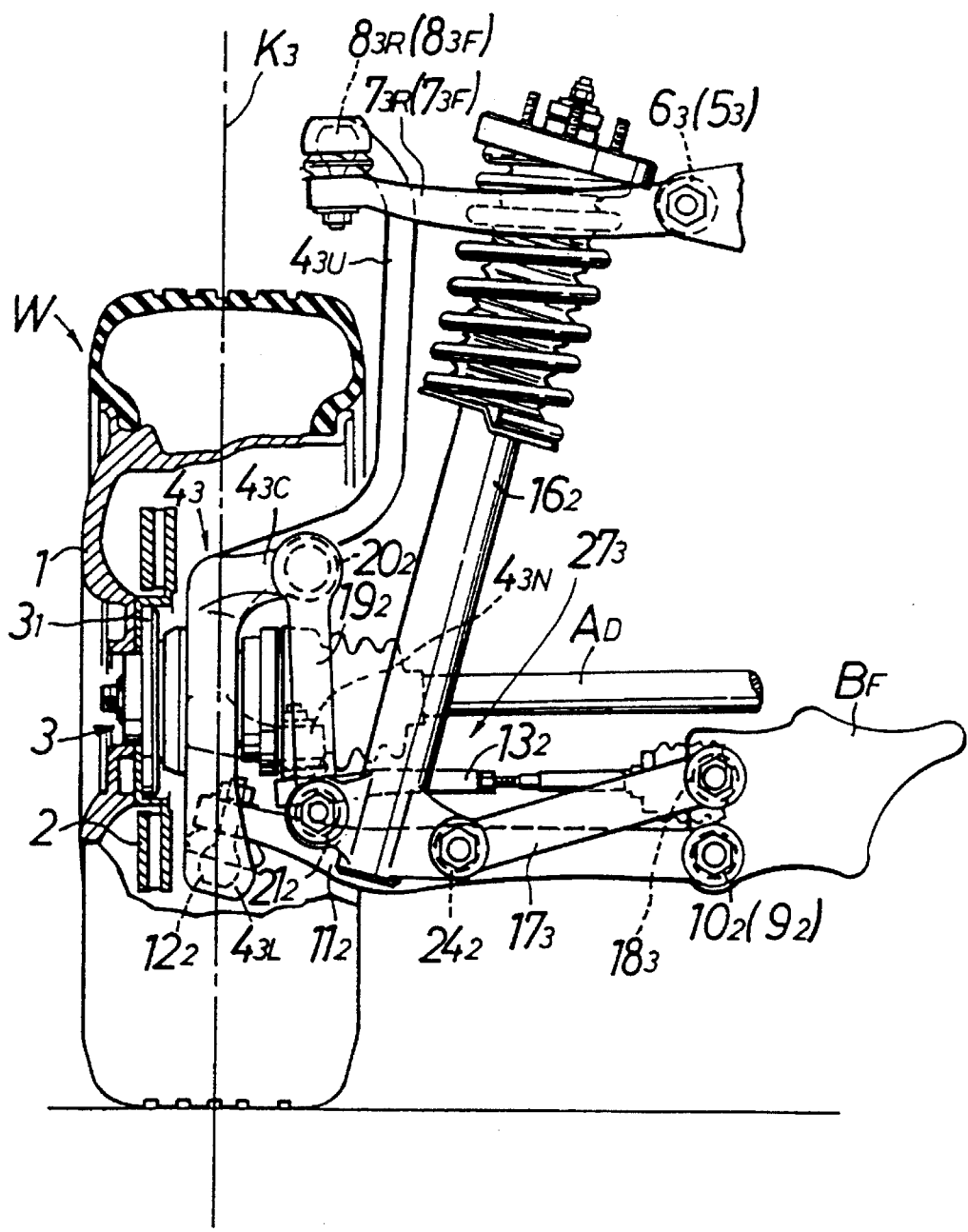
FIG. 8 is a view of a suspension system for a left front wheel of an automobile according to a third embodiment of the invention, taken from the rear of a vehicle body.
Figure 9:
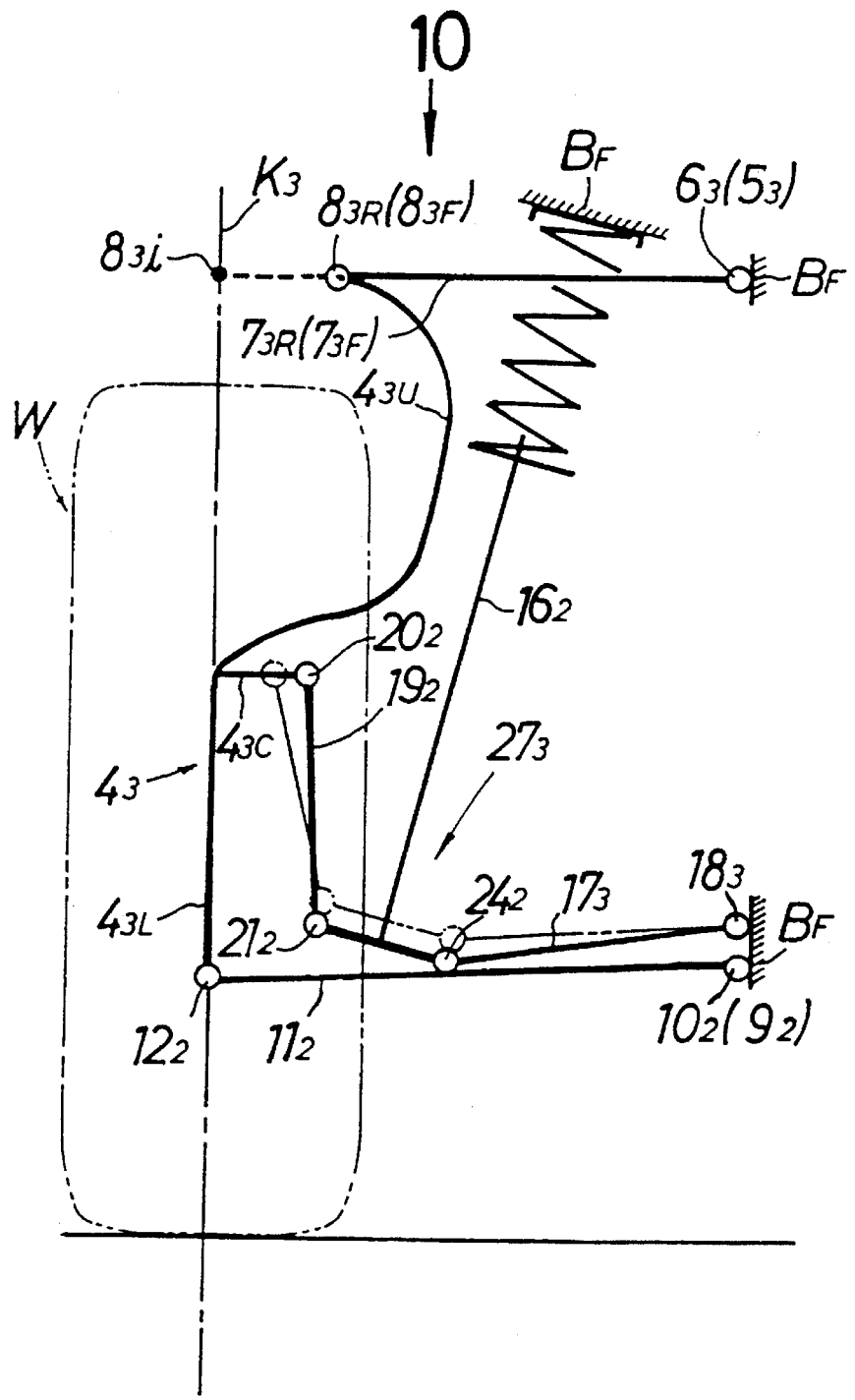
FIG. 9 is a diagram corresponding to FIG. 8 for explaining its operation.

A third embodiment of the present invention will now be described in connection with FIGS. 8 to 10. The same components or parts as in the second embodiment are designated by like reference characters, and the detailed description thereof is omitted.

The third embodiment has a distinguishing feature in the structures of an upper support portion $4_{3U}$ of a knuckle $4_3$ and upper arms $7_{3F}$ and $7_{3R}$ which connect the upper support portion $4_{3U}$ with the vehicle body frame $B_F$, as compared with the above-described second embodiment. More specifically, the upper support portion $4_{3U}$ of the knuckle $4_3$ in the third embodiment extends around the steered wheel W to a position above the steered wheel W, and the two front and rear upper arms $7_{3F}$ and $7_{3R}$ connected respectively to two ball joints $8_{3F}$ and $8_{3R}$ provided at an upper end of the upper support portion $4_{3U}$ are pivotally supported on the vehicle body frame $B_F$ through rubber bush joints $5_3$ and $6_3$, respectively. Further, a second rod $17_3$ is pivotally supported on the vehicle body frame $B_F$ through a ball joint $18_3$. A first rod $19_3$ and the second rod $17_3$ constitute a link mechanism $27_3$, as in the first embodiment.

Figure 10:
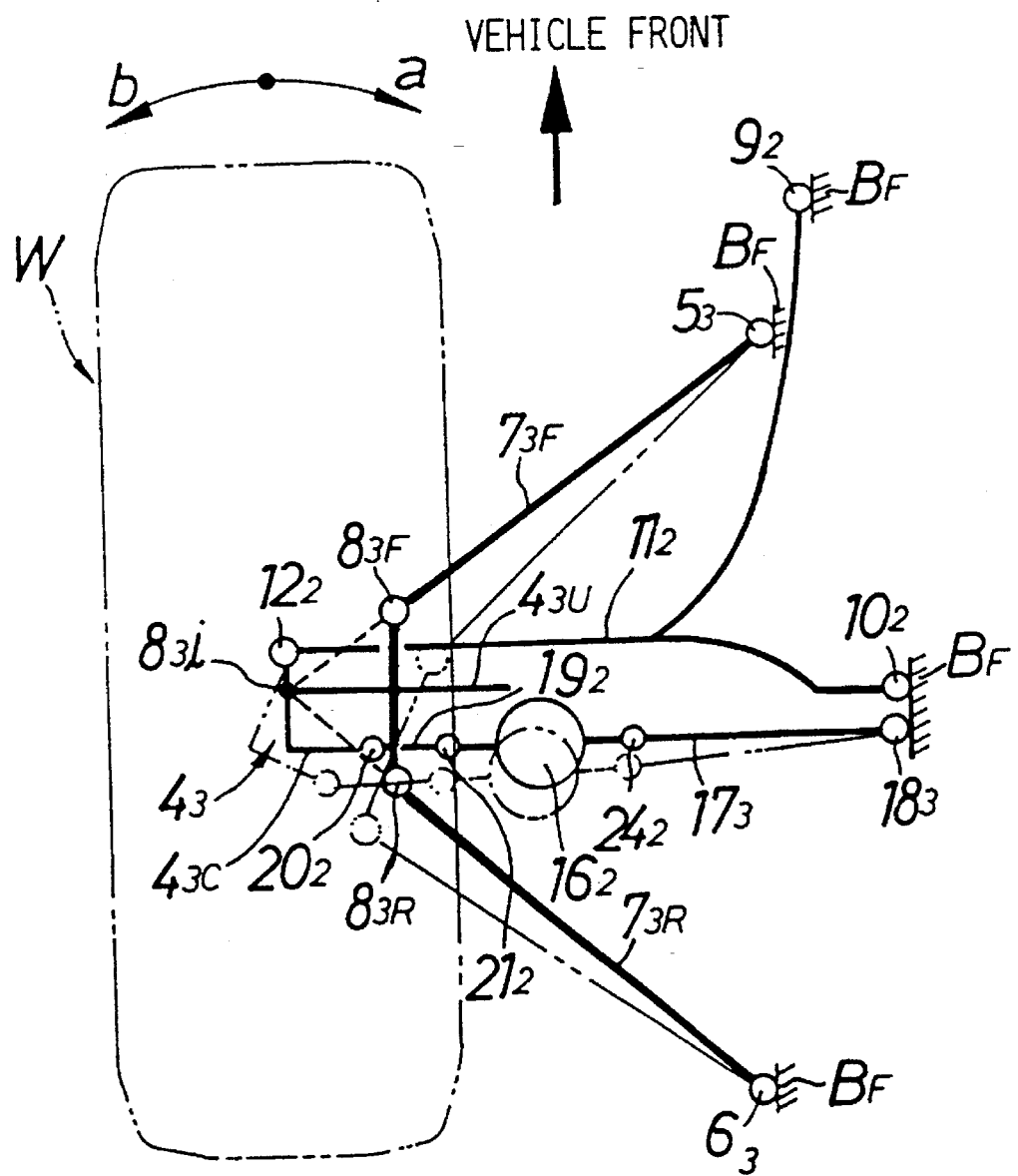
FIG. 10 is a diagram taken along an arrow 10 in FIG. 9.

As can be seen from FIG. 10, extensions of the two upper arms $7_{3F}$ and $7_{3R}$ in an outward direction of the vehicle body intersect each other on a center line of the steered wheel W, and such intersection is a phantom steering center $8_{3i}$. Therefore, the steered wheel W is steered about a king pin axis $K_3$ which connects a ball joint $12_2$ on a lower support portion $4_{3L}$ of the knuckle $4_3$ with the phantom steering center $8_{3i}$. The king pin axis $K_3$ lies within a vertical plane passing the center of the steered wheel W as in the second embodiment and therefore, even if both of the king pin offset and the king pin inclination angle become zero, the generation of a torque steering phenomenon is prevented. Moreover, since the upper support portion $4_{3U}$ extends above the steered wheel W, the need for accommodating the upper arms $7_{3F}$ and $7_{3R}$ within a narrow internal space in a wheel disk 1 is eliminated, thereby enabling an increase in degree of freedom of design. The upper arms $7_{3F}$ and $7_{3R}$ are provided in a bisected manner and therefore, outer ends of the upper arms $7_{3F}$ and $7_{3R}$ can be moved inwardly of the vehicle body relative to the phantom steering center $8_{3i}$ to prevent interference with a fender.

Even in the third embodiment, with the steering of the steered wheel W, which is an outer wheel during turning of the vehicle, in a direction of an arrow a (in FIG. 10), the first rod $19_2$ can be pulled upwardly to compress the damper $16_2$, and a restoring force can be generated in the steering device by a restoring force of the damper $16_2$.

In this embodiment, the second rod $17_3$ is pivotally supported on the vehicle body frame $B_F$ through the ball joint $18_3$. Alternatively, it may be pivotally supported on the lower arm $11_2$ through a rubber bush joint, as in the second embodiment, in order to suppress the swinging angle. In addition, only the upper arms $7_{3F}$ and $7_{3R}$ are of a double joint type in this embodiment, but lower arm $11_2$ may also be of a double joint type.

FIGS. 11 to 15 illustrates a fourth embodiment of the present invention. A right front wheel has the same specularly symmetrical structure as a left front wheel and hence, the illustration thereof is omitted.

Figure 11:
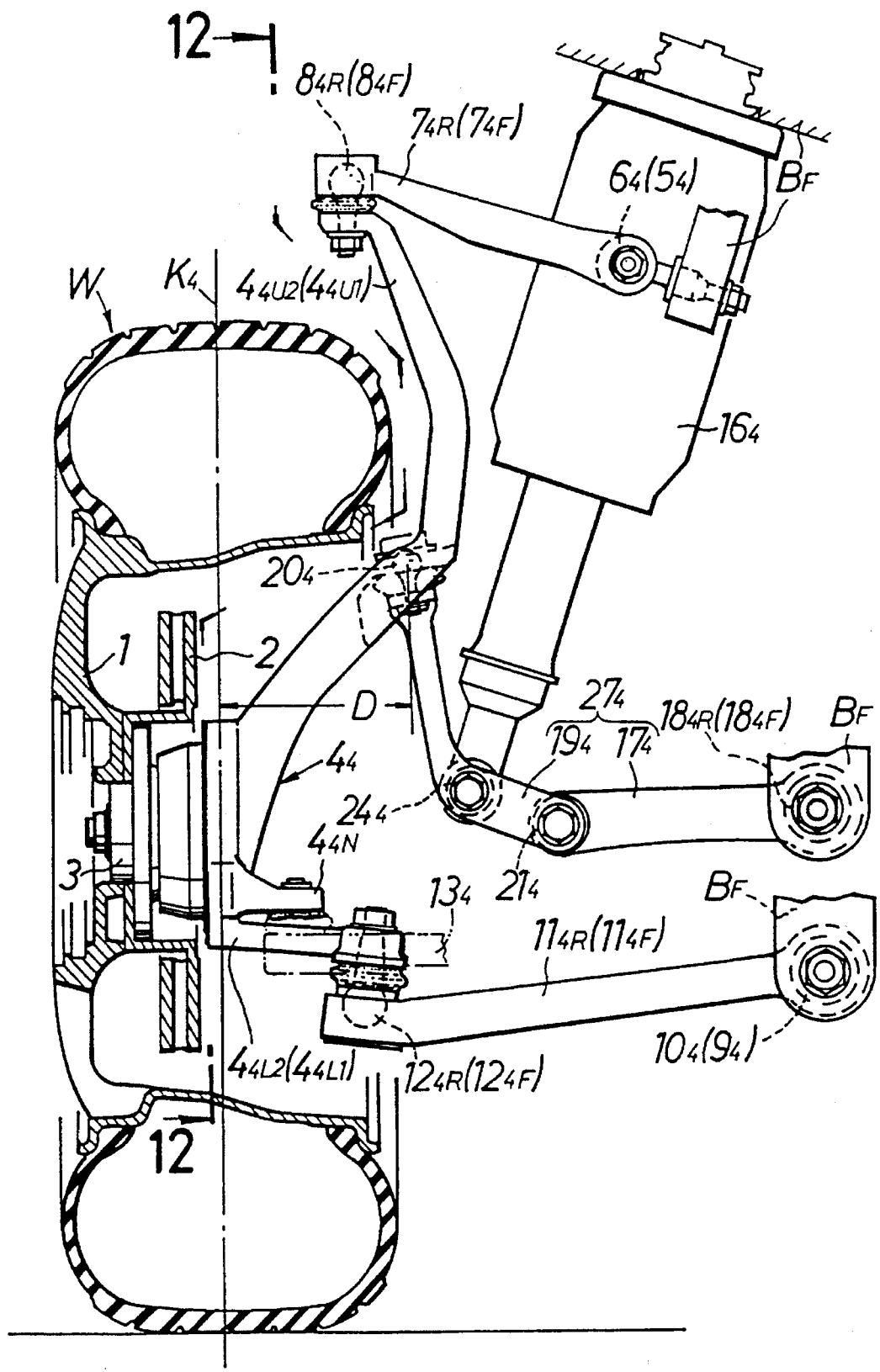
FIG. 11 is a view of a suspension system for a left front wheel of an automobile according to a fourth embodiment of the invention, taken from the rear of a vehicle body.
Figure 12:
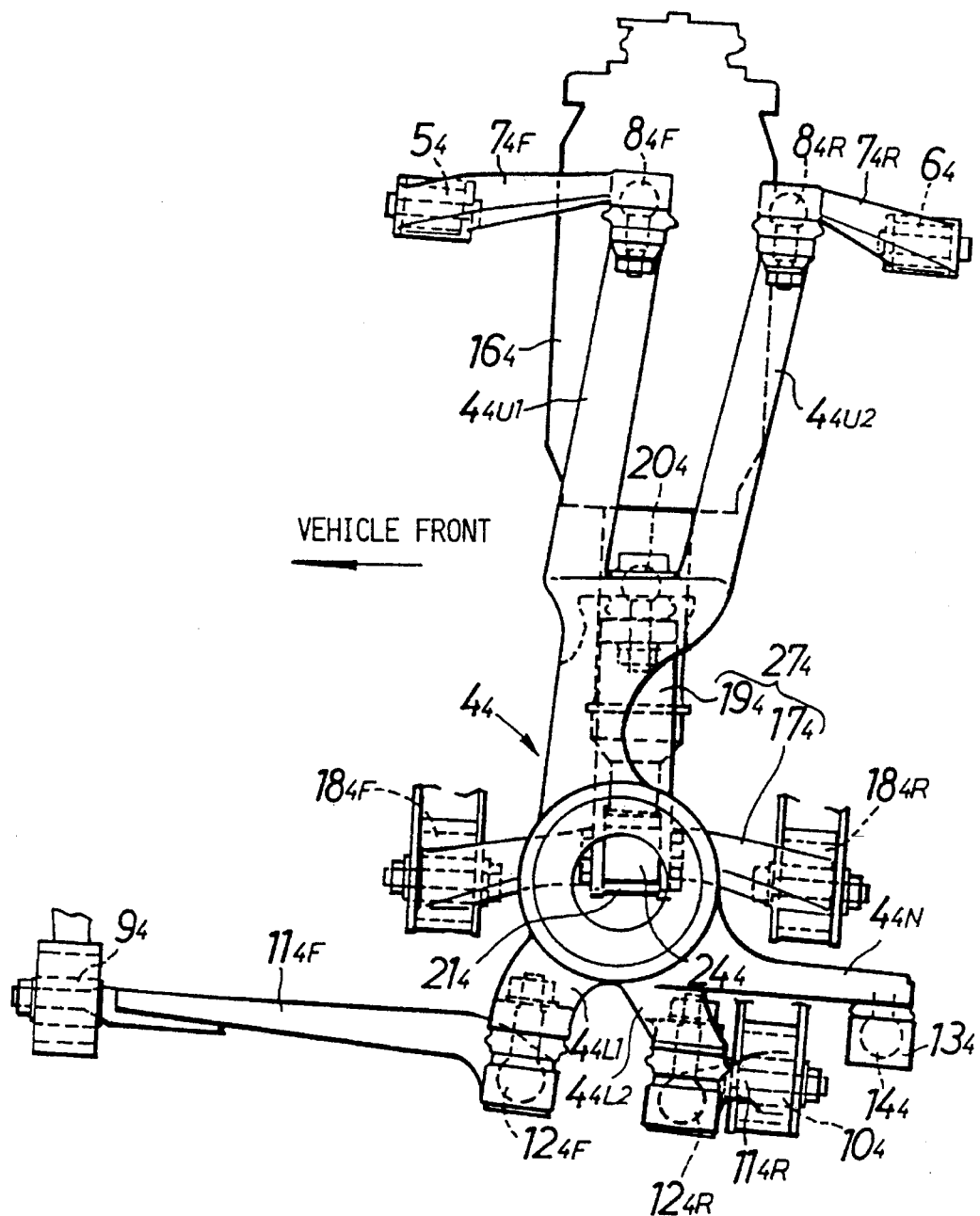
FIG. 12 is a view taken along a line 12—12 in FIG. 11.
Figure 13:
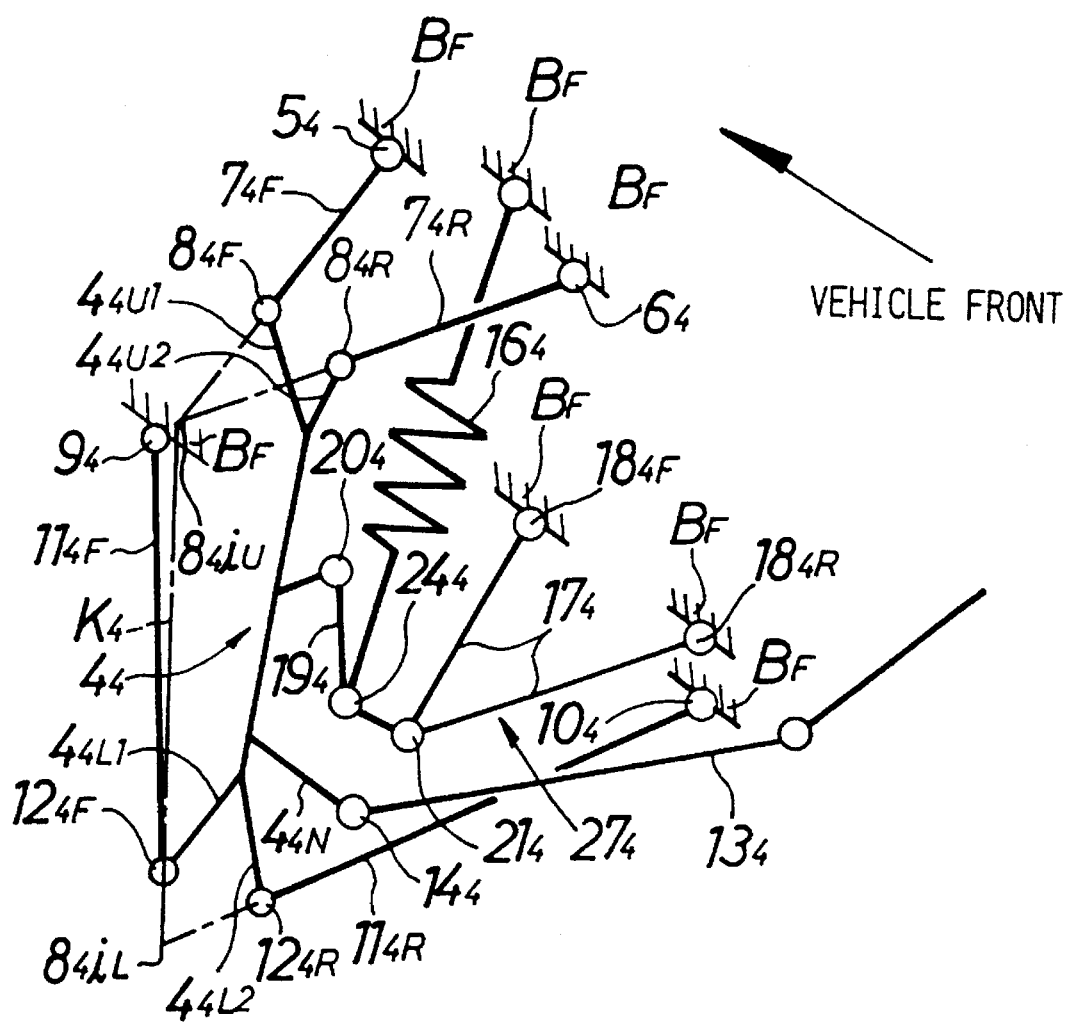
FIG. 13 is a skeleton diagram of the suspension system of FIG. 11.

As shown in FIGS. 11 to 13, a wheel disk 1 in a steered wheel W (a left front wheel) of an automobile is coupled at its central portion to a wheel hub 3 together with a brake disk 2, and the wheel hub 3 is rotatably supported on a knuckle $4_4$ through a ball bearing which is not shown.

A pair of front and rear lower branch arms $4_{4L1}$ and $4_{4L2}$ bifurcated inwardly in a widthwise direction of the vehicle body are integrally formed on a lower portion of the knuckle $4_4$, and a pair of upper branch arms $4_{4U1}$ and $4_{4U2}$ bifurcated to extend upwardly from an inner surface of the steered wheel W are integrally formed on an upper portion of the knuckle $4_4$. A steering support portion $4_{4N}$ is also integrally formed on the knuckle $4_4$ to extend rearwardly of the vehicle body.

The pair of front and rear lower branch arms $4_{4L1}$ and $4_{4L2}$ of the knuckle $4_4$ are connected to the vehicle body frame $B_F$ through lower arms $11_{4F}$ and $11_{4R}$ which are of a double joint type. More specifically, the front lower arm $11_{4F}$ is pivotally supported at its outer end on the front lower branch arm $4_{4L1}$ through a ball joint $12_{4F}$ and at its inner end on the vehicle body frame $B_F$ through a rubber bush joint $9_4$. The rear lower arm $11_{4R}$ is pivotally supported at its outer end on the rear lower branch arm $4_{4L2}$ through a ball joint $12_{4R}$ and at its inner end on the vehicle body frame $B_F$ through a rubber bush joint $10_4$.

The pair of front and rear upper branch arms $4_{4U1}$ and $4_{4U2}$ of the knuckle $4_4$ are connected to the vehicle body frame $B_F$ through upper arms $7_{4F}$ and $7_{4R}$ which are of a double joint type. More specifically, the front upper arm $7_{4F}$ is pivotally supported on the front upper branch arm $4_{4U1}$ through a ball joint $8_{4F}$ and at its inner end on the vehicle body frame $B_F$ through a rubber bush joint $5_4$. The rear upper arm $7_{4R}$ is pivotally supported at its outer end on the rear upper branch arm $4_{4U2}$ through a ball joint $8_{4R}$ and at its inner end on the vehicle body frame $B_F$ through a rubber bush joint $6_4$.

The knuckle $4_4$ is vertically movably supported on the vehicle body frame $B_F$ through the pair of front and rear lower arms $11_{4F}$ and $11_{4R}$ and the pair of front and rear upper arms $7_{4F}$ and $7_{4R}$. In such structure a straight line connecting an intersection $8_{4iL}$ between the pair of front and rear lower arms $11_{4F}$ and $11_{4R}$ extended outwardly in the widthwise direction of the vehicle body with an intersection $8_{4iU}$ between the pair of front and rear upper arms $7_{4F}$ and $7_{4R}$ extended outwardly in the widthwise direction of the vehicle body constitutes a phantom king pin axis $K_4$ of the steered wheel W (see FIG. 13). This king pin axis $K_4$ lies within a rotational plane for the steered wheel W and hence, both of the king pin offset and the king pin inclination angle of the steered wheel W are set to be zero (see FIG. 11).

The steering support portion $4_{4N}$ of the knuckle $4_4$ is connected at its tip end to a tie rod $13_4$ through a ball joint $14_4$, whereby the knuckle $4_4$ is permitted to be rotated leftwardly and rightwardly about the king pin axis $K_4$ to steer the steered wheel W.

A suspension spring $16_4$ comprising a coil spring integrally formed on a shock absorber for suspending the steered wheel W is supported at its upper end on the vehicle body frame $B_F$ through a rubber bush joint and at its lower end by a suspension spring supporting means $27_4$ serving as a link mechanism which comprises a pull rod $19_4$ as a first rod and an A-shaped arm $17_4$ as a second rod. More specifically, an outer end of the pull rod $19_4$ extending upwardly is pivotally supported to a ball joint $20_4$ provided at a branch portion of the pair of front and rear upper branch arms $4_{4U1}$ and $4_{4U2}$ of the knuckle $4_4$, and an inner end of the pull rod $19_4$ located below the outer end is pivotally supported to an outer end of the A-shaped arm $17_4$ through a rubber bush joint $21_4$. The A-shaped arm $17_4$ is pivotally supported at its bifurcated inner ends to the vehicle body frame $B_F$ through rubber bush joints $18_{4F}$ and $18_{4R}$, respectively. The suspension spring $16_4$ is pivotally supported at its lower end to a lower portion of the pull rod $19_4$ through rubber bush joint $24_4$. As can be seen from FIG. 11, the ball joint $20_4$ connecting the knuckle $4_4$ with the pull rod $19_4$ is provided at a location offset inwardly in the widthwise direction of the vehicle body from the king pin axis $K_4$ by a distance D.

The operation of the fourth embodiment having the above-described construction will be described below.

Figure 14:
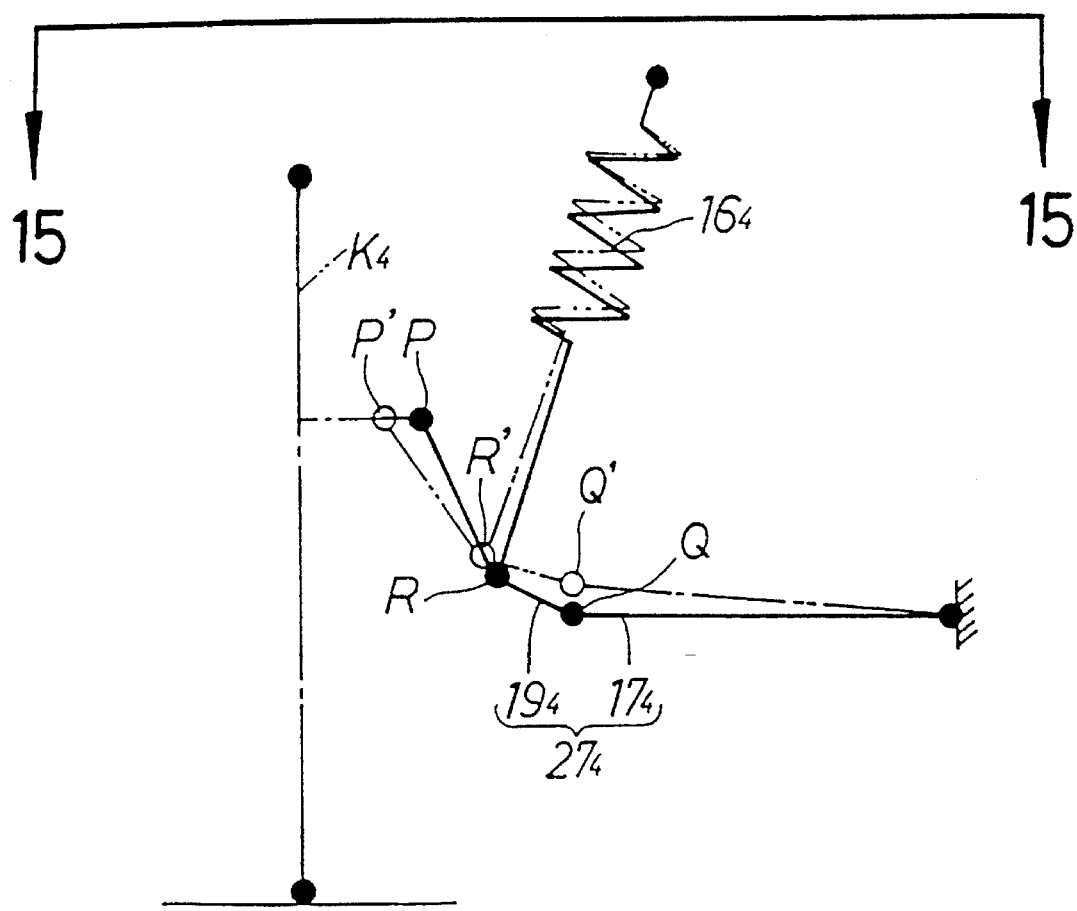
FIG. 14 is a diagram for explaining the operation of the suspension system of FIG. 11.
Figure 15:
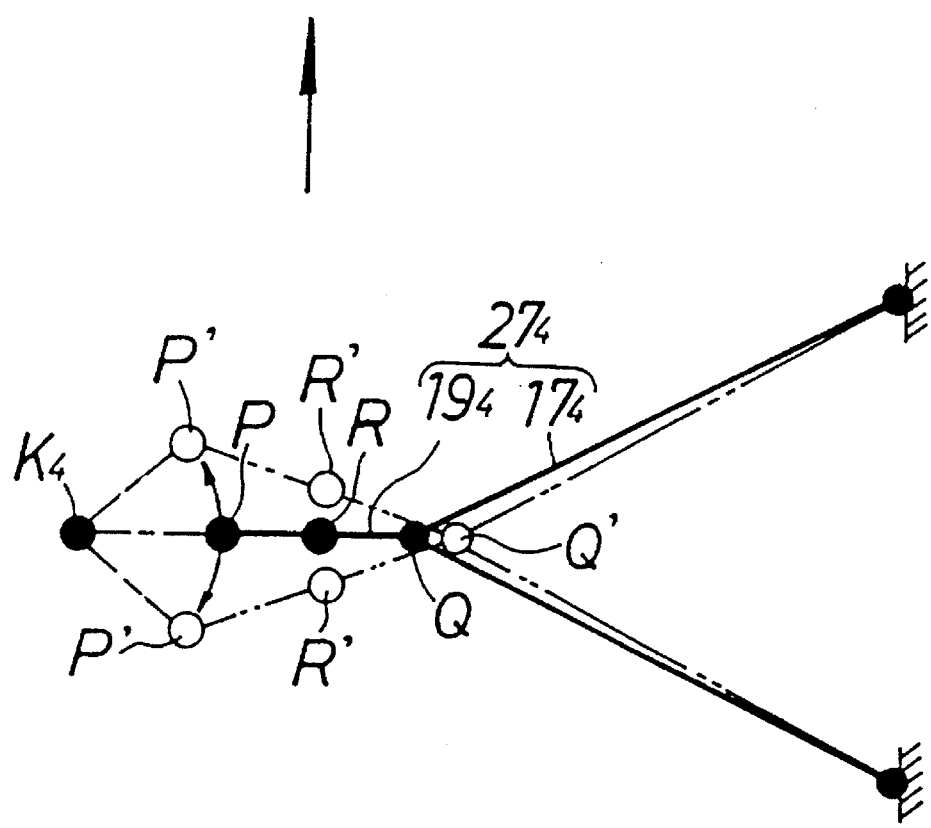
FIG. 15 is a diagram taken in a direction of line 15—15 in FIG. 14.

As can be seen from FIGS. 11 and 13, the king pin axis $K_4$ connecting the intersection $8_{4iL}$ between the pair of front and rear lower arms $11_{4F}$ and $11_{4R}$ extended outwardly in the widthwise direction of the vehicle body with the intersection $8_{4iU}$ between the pair of front and rear upper arms $7_{4F}$ and $7_{4R}$ extended outwardly in the widthwise direction of the vehicle body is located within a vertical plane passing the center of the steered wheel W and for this reason, the king pin offset and the king pin inclination angle are zero. The deficient tendency of restoring torque of the steering device due to this setting is eliminated in this embodiment in the following manner:

Referring to FIGS. 14 and 15, when the steered wheel W is steered leftwardly or rightwardly to swing the vehicle, the knuckle $4_4$ is rotated counterclockwise or clockwise about the king pin axis $K_4$ and hence, the ball joint $20_4$ provided at the location offset inwardly in the widthwise direction of the vehicle body from the king pin axis $K_4$ is moved from a point P to a point P'. As a result, the ball joint $21_4$ connecting the pull rod $19_4$ with the A-shaped arm $17_4$ is moved from point Q to a point Q', and the rubber bush joint $24_4$ connecting the pull rod $19_4$ with the suspension spring $16_4$ is moved from a point R to a point R', so that the pull rod $19_4$, the A-shaped arm $17_4$ and the suspension spring $16_4$ are brought from states shown by solid lines into states shown by dashed lines in FIGS. 14 and 15. As can be seen from FIG. 14, the rubber bush joint $24_4$ at the lower end of the suspension spring $16_4$ is moved upwardly from the point R toward the point R', so that the suspension spring $16_4$ is compressed by leftward or rightward steering. If the suspension spring $16_4$ is compressed in this manner, the steered wheel W is biased toward the neutral position before the steering operation is completed by a restoring force thereof and hence, a restoring torque can be generated in the steering device. Thus, the suspension spring corresponds to the resilient means in this embodiment according to the present invention.

Since the A-shaped arm $17_4$ is pivotally supported on the vehicle body frame $B_F$ through the two rubber bush joints $18_{4F}$ and $18_{4R}$, the rubber bush joint $21_4$ to which the lower end of the pull rod $19_4$ is connected is movable only in the vertical direction, and movement in the longitudinal direction of the vehicle body is restrained. Consequently, the pull rod $19_4$ can be moved vertically without large deflection in the longitudinal direction of the vehicle body and as a result, the pivotal movement of the knuckle $4_4$ caused by the steering of the steered wheel W can be converted into the vertical movement of the pull rod $19_4$ to compress the suspension spring $16_4$, thereby generating a sufficient restoring torque in the steering device.

Figure 16:
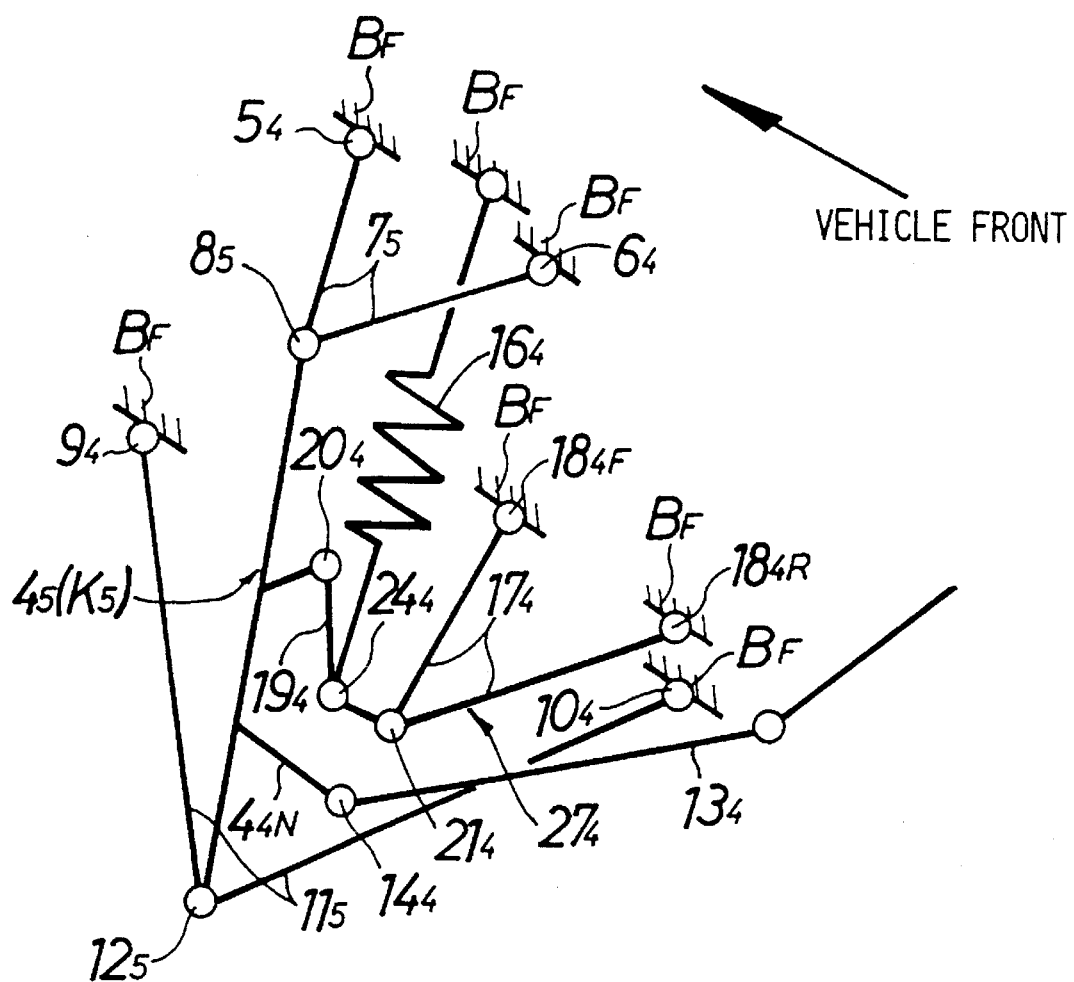
FIG. 16 is a skeleton diagram of a suspension system according to a fifth embodiment of the invention.

FIG. 16 illustrate a skeleton diagram of a fifth embodiment and is similar to FIG. 13. the same components or parts as those in FIG. 13 are designated by the same reference characters, and the detailed description thereof is omitted.

In the fifth embodiment, in place of the pair of front and rear lower arms $11_{4F}$ and $11_{4R}$ and the pair of front and rear upper arms $7_{4F}$ and $7_{4R}$ used in the fourth embodiment, an A-shaped lower arm $11_5$ and an A-shaped upper arm $7_5$ are included and pivotally supported at their outer ends on a knuckle $4_5$ on a king pin axis $K_5$ through ball joints $12_5$ and $8_5$. In the fifth embodiment, the king pin offset cannot be set at zero, but by setting the king pin offset at an extremely small value, the substantially same effect of operation as any of the previously-described embodiments can be obtained.

Figure 17:
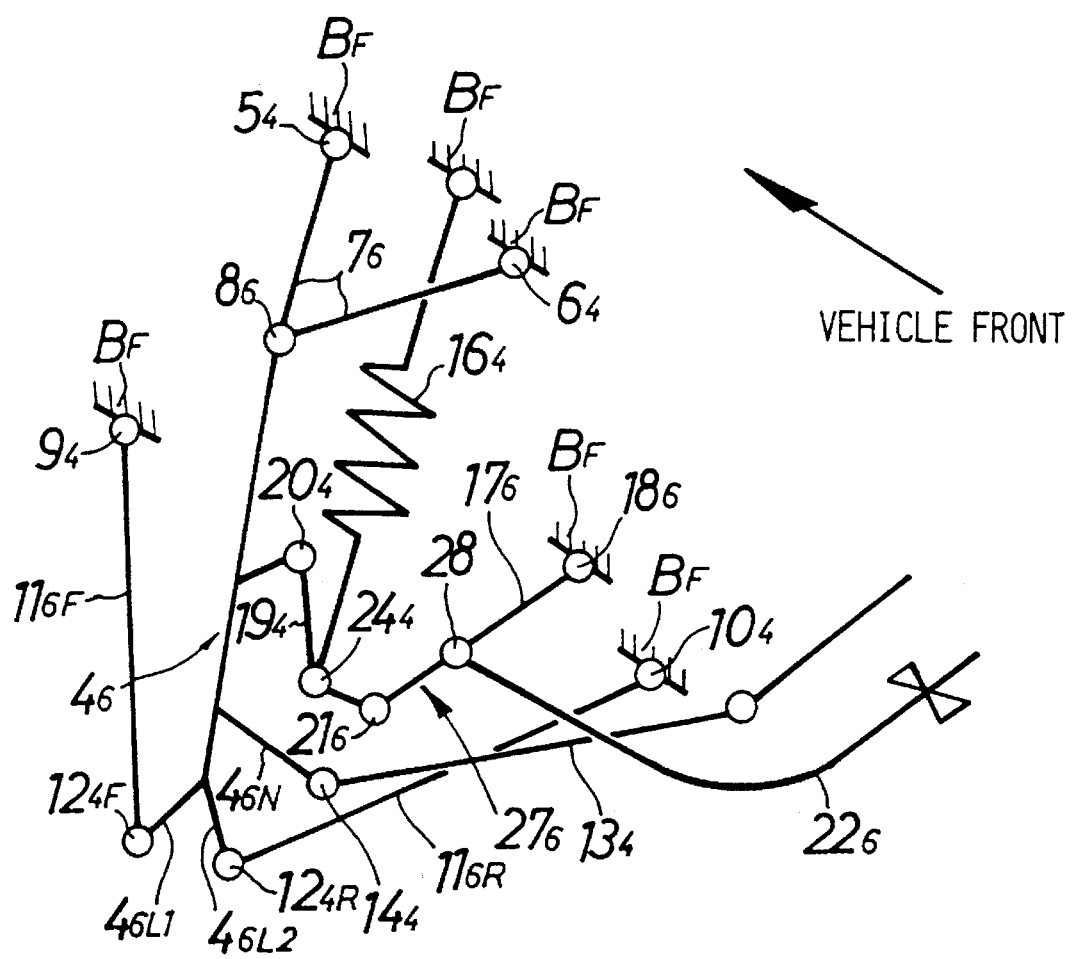
FIG. 17 is a skeleton diagram of a suspension system according to a sixth embodiment of the invention.

FIG. 17 illustrates a sixth embodiment of the present invention and is similar to FIG. 16. The same components or parts as those in FIG. 16 are designated by the same reference characters, and the detailed description thereof is omitted.

In the sixth embodiment, lower arms $11_{6F}$ and $11_{6R}$ of a double joint type and an A-shaped upper arm $7_6$ are provided, and a suspension spring supporting means $27_6$ as a link mechanism includes an I-shaped arm $17_6$ provided in place of the A-shaped arm $17_4$ used in the fourth embodiment and is pivotally supported at its opposite ends on the pull rod $19_4$ and the vehicle body frame $B_F$ through rubber bush joints $21_6$ and $18_6$. An intermediate portion of the I-shaped arm $17_6$ is connected to an end of a stabilizer $22_6$ as a restraining arm through a ball joint 28. According to the sixth embodiment, the I-shaped arm $17_6$ is reinforced by the stabilizer $22_6$ to provide an increased rigidity in the longitudinal direction of the vehicle body. Therefore, as does the A-shaped arm $17_4$ in the fourth and fifth embodiments, a deflection of the lower end of the suspension spring $16_4$ in the longitudinal direction of the vehicle body can be prevented, and sufficient restoring torque can be generated in the steering device.

Figure 18:
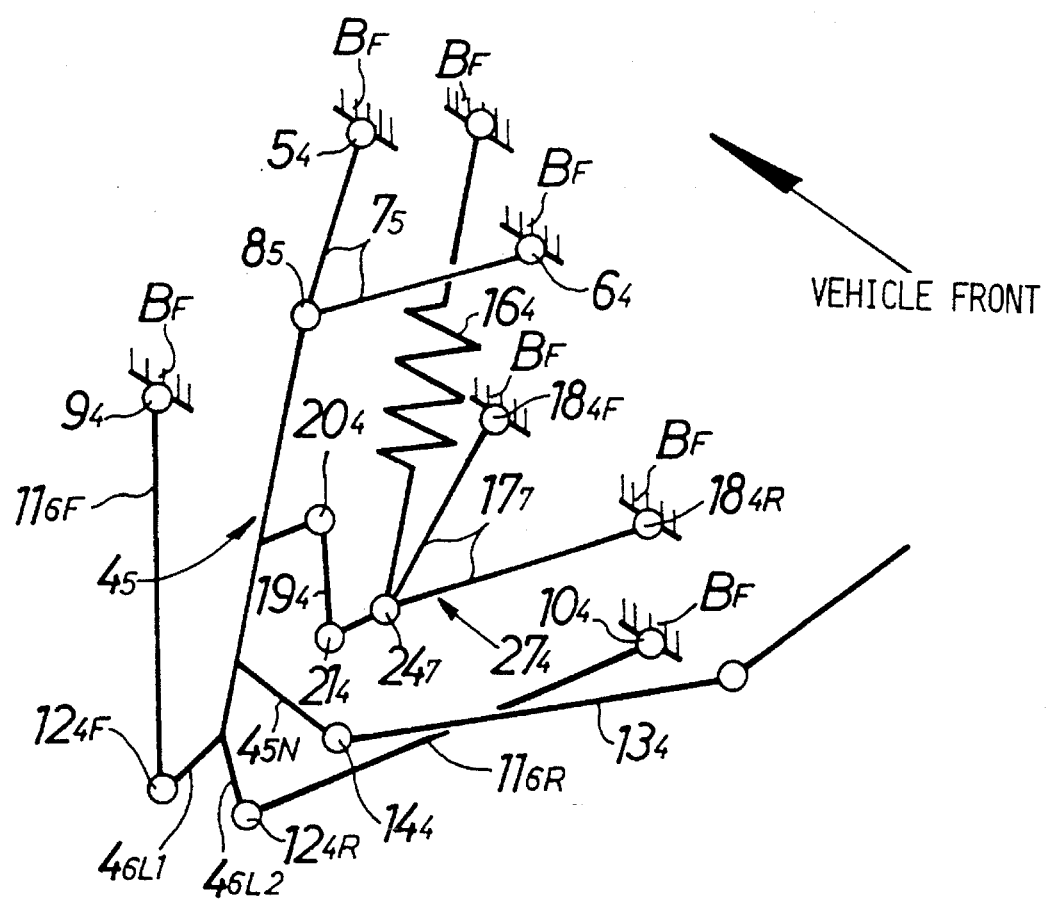
FIG. 18 is a skeleton diagram of a suspension system according to a seventh embodiment of the invention.

FIG. 18 illustrates a seventh embodiment of the present invention and is similar to FIG. 16. The same components or parts as those in FIG. 16 are designated by the same reference characters, and the detailed description thereof is omitted.

The seventh embodiment has a feature that the lower end of the suspension spring $16_4$ is supported on an A-shaped arm $17_7$ rather than on the pull rod $19_4$ through a rubber bush joint $24_7$. According to the seventh embodiment, the lower end of the suspension spring $16_4$ is moved vertically without deflection in the longitudinal direction of the vehicle body and therefore, the suspension spring $16_4$ can be compressed further effectively to generate a sufficient restoring torque in the steering device.

Figure 19:
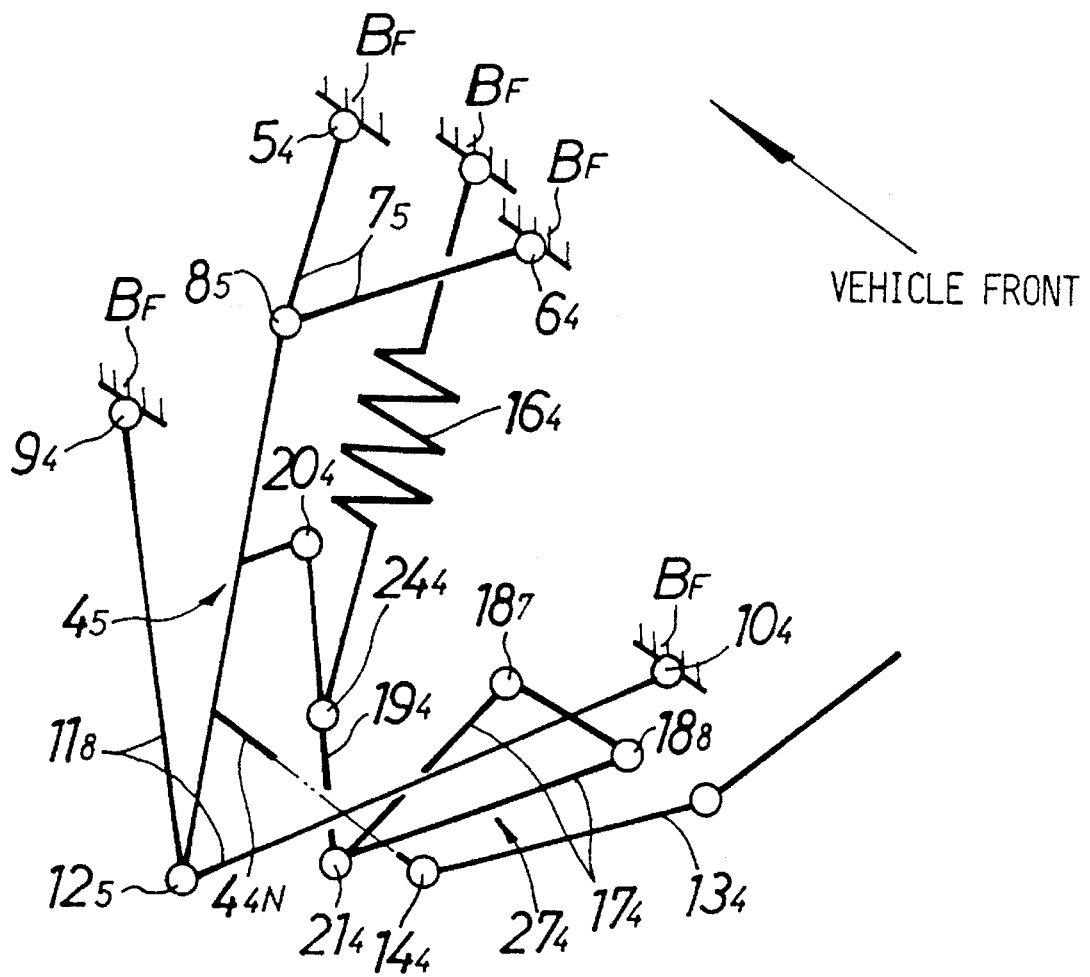
FIG. 19 is a skeleton diagram of a suspension system according to an eighth embodiment of the invention.

FIG. 19 illustrates an eighth embodiment of the present invention and is similar to FIG. 16. The same components or parts as those in FIG. 16 are designated by the same reference characters, and the detailed description thereof is omitted.

The eighth embodiment has a feature that the A-shaped arm $17_4$ is pivotally supported on a rear lower arm $11_8$ through rubber bush joints $18_7$ and $18_8$ in place of being pivotally supported on the vehicle body frame $B_F$. According to the eighth embodiment, the number of joints provided on the vehicle body frame $B_F$ can be reduced to provide a simplified structure, and a space within a wheel house can be effectively utilized to provide an increased degree of freedom in design.

Figure 20:
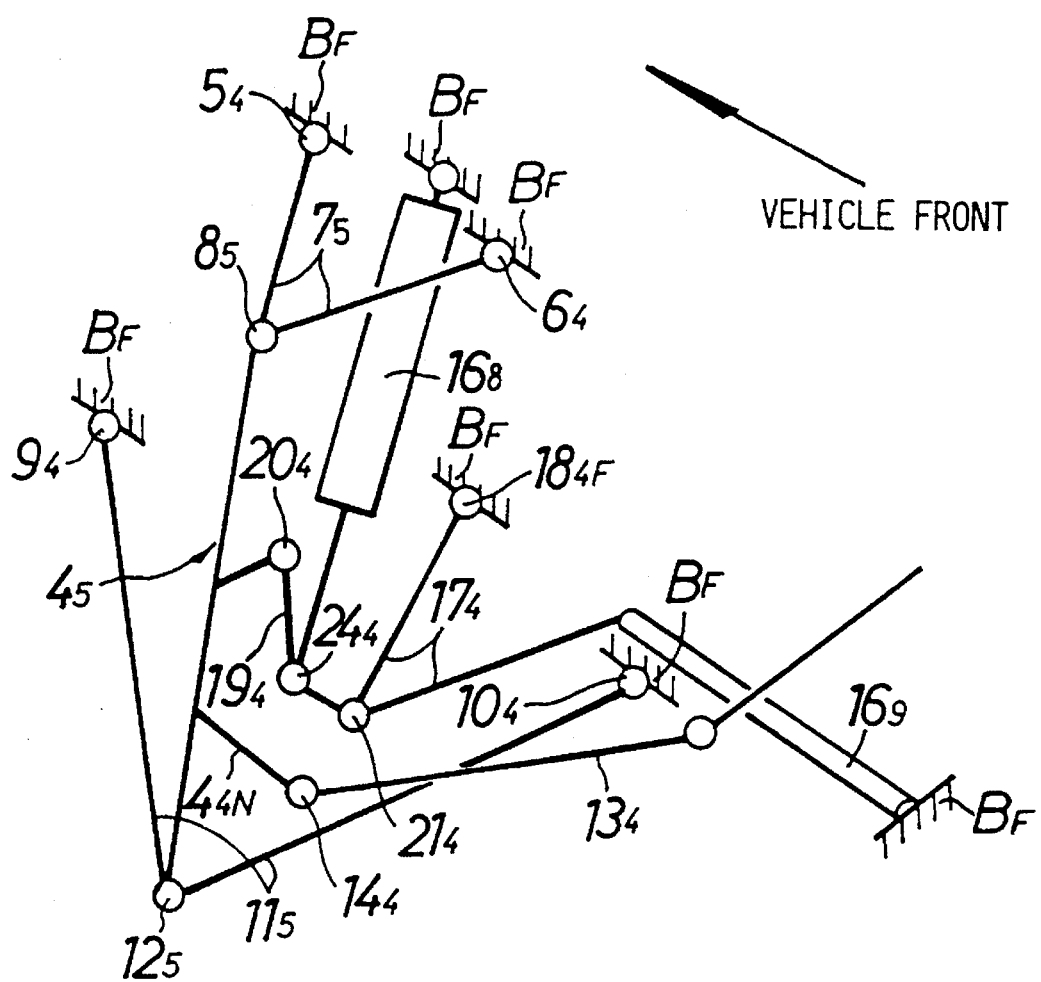
FIG. 20 is a skeleton diagram of a suspension system according to a ninth embodiment of the invention.

FIG. 20 illustrates a ninth embodiment of the present invention and is similar to FIG. 16. The same components or parts as those in FIG. 16 are designated by the same reference characters, and the detailed description thereof is omitted.

In the ninth embodiment, the intermediate portion of the pull rod $19_4$ and the vehicle body frame $B_F$ are interconnected by a simple shock absorber $16_8$ having no suspension spring, and a base end of one of the branches of the A-shaped arm $17_4$ and the vehicle body frame $B_F$ are interconnected by a suspension spring $16_9$ comprising a torsion bar disposed to extend longitudinally of the vehicle body. According to this embodiment, a twisting can be applied to the suspension spring $16_9$ comprising the torsion bar as a result of vertically swinging movement of the A-shaped arm $17_4$ caused by steering, and a restoring torque can be generated in the steering device by a resilient force of the suspension spring $16_9$. The degree of freedom in layout can be increased by separating the shock absorber $16_8$ and the suspension spring $16_9$ from each other.

Figure 21:
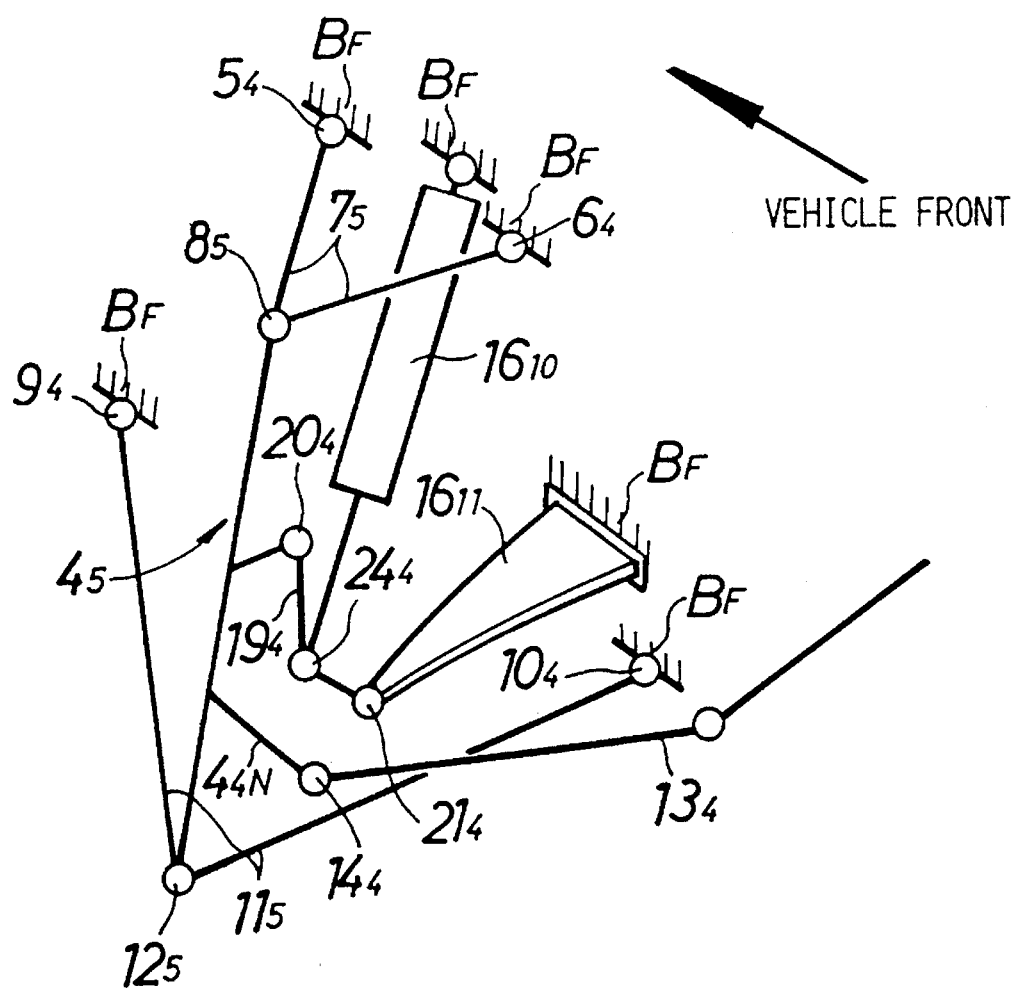
FIG. 21 is a skeleton diagram of a suspension system according to a tenth embodiment of the invention.

FIG. 21 illustrates a tenth embodiment of the present invention and is similar to FIG. 16. The same components or pans as those in FIG. 16 are designated by the same reference characters, and the detailed description thereof is omitted.

In the tenth embodiment, the intermediate portion of the pull rod $19_4$ and the vehicle body frame $B_F$ are interconnected by a shock absorber $16_{10}$, and the lower end of the pull rod $19_4$ and the vehicle body frame $B_F$ are interconnected by a suspension spring $16_{11}$ comprising a leaf spring in place of the A-shaped arm $17_4$ used in the fifth embodiment. The spring $16_{11}$ can be flexed vertically by the vertical movement of the pull rod $19_4$ caused by steering, and a restoring torque can be generated in the steering device by a resilient force of the suspension spring $16_{11}$. The number of parts and the space is desirably reduced by providing the suspension spring $16_{11}$ with a function of the A-shaped arm $17_4$, and the suspension is still effective because the vertical movement of the pull rod $19_4$ is transmitted as it is, to the suspension spring $16_{11}$ and therefore, a large restoring torque can be provided.

The above-described fourth to tenth embodiments of the present invention are also applicable to a suspension system including a lower arm which is A-shaped, and an upper arm of a double joint type. A ball joint can be used in place of the rubber bush joint $24_4$, $24_7$ supporting the lower end of the suspension spring $16_4$. In addition, in place of the stabilizer $22_6$, a radius rod can be also used as the restraining arm. Further any spring other than the coil spring, the torsion bar and the leaf spring can be used as the suspension spring $16_4$.

Although preferred embodiments of the present invention have been described, it will be understood that the present invention is not limited to these embodiments, and various modifications in design can be made without departing from the spirit and scope of the invention. For example, the present invention is applicable to any suspension system, if it is used for a steered wheel, whether or not the steered wheel is a driven wheel. The scope of the invention is indicated by the appended claims, rather than by the foregoing description.

What is claimed is:

1. A suspension system for a steered wheel, comprising:

a knuckle for steerably supporting the steered wheel about a king pin axis;

upper and lower arms pivotally supported on a vehicle body and connected at free ends thereof to upper and lower portions of said knuckle, respectively;

a link mechanism including a first substantially vertically extending rod connected to the knuckle at a location more inward of the vehicle body than said king pin axis, and a second rod connected at one end thereof to said first rod and at the other end to at least one of the vehicle body and the lower arm;

said link mechanism being resiliently deformed during a steering operation to an extent corresponding to the steering operation; and a resilient means connected to said link mechanism for exhibiting a resilient force repulsive to deformation of said link mechanism So as to apply a restoring torque to the steering knuckle.

2. A suspension system for a steered wheel according to claim 1, wherein said resilient means comprises a stabilizer extending laterally of the vehicle body, and a free end of said stabilizer is connected to said second rod.

3. A suspension system according to claim 2, wherein said stabilizer has one end thereof connected to said link mechanism, and an opposite end thereof connected to another link mechanism for another steered wheel.

4. A suspension system for a steered wheel according to claim 1, wherein said resilient means comprises a damper for damping vertical movement of said knuckle, and a lower end of said damper is connected to said knuckle through said first rod and to one of the vehicle body and the lower arm through said second rod.

5. A suspension system for a steered wheel according to claim 1, wherein said resilient means comprises a suspension spring, said second rod is an A-shaped arm, said other end of the second rod is pivotally supported, at two points, to said vehicle body, and said suspension spring is supported by said link mechanism.

6. A suspension system for a steered wheel according to claim 1, wherein said resilient means comprises a suspension spring, said second rod is an I-shaped arm, said other end of the second rod is pivotally supported at one point, to said vehicle body, the suspension further comprises a restraining arm pivotally supported on the vehicle body, said restraining arm is connected at an end thereof to said I-shaped arm, and said suspension spring is supported by said link mechanism.

7. A suspension system for a steered wheel according to claim 1, wherein said resilient means comprises a suspension spring which is supported at one end thereof on the vehicle body, and a tip end on the other end of the suspension spring is supported on a tip end of said first rod.

8. A suspension system according to claim 1, wherein the king pin axis as established by the suspension system is set to a very small value near zero relative to vertical.

9. A suspension system according to claim 1, wherein the king pin axis as established by the suspension system is zero.

10. A suspension system according to claim 1, wherein said second rod extends substantially horizontally.

11. A suspension system according to claim 1, wherein said second rod extends laterally with respect to the vehicle body.

12. A suspension system according to claim 1, wherein the steered wheel is connected to a steering mechanism, said link mechanism is deformed during operation of the steering mechanism, and said resilient repulsive force of said resilient means applies a restoring torque to the steering mechanism.

13. A suspension system according to claim 1, further including a spring and damper unit having an upper end connected to the vehicle body and a lower end connected to said lower arm.

14. A suspension system according to claim 1, wherein said resilient force exhibited by and said restoring torque applied by said resilient means correspond to an extent of deformation of said link mechanism.

15. A suspension system for a steered wheel, comprising:
a knuckle for steerably supporting the steered wheel about a king pin axis;
upper and lower arms pivotally supported on a vehicle body and connected at free ends thereof to upper and lower portions of said knuckle, respectively;
link means for operatively connecting said knuckle to the vehicle body and for being resiliently deformed during a steering operation of the steered wheel; and
resilient means connected to said link means for exhibiting a resilient force repulsive to the deformation of said link means so as to apply a restoring torque to the steering knuckle through the link means.

16. A suspension system according to claim 15, wherein said resilient means accumulates said resilient repulsive force therein with deformation of said link means.

17. A suspension system according to claim 15, wherein said link means is connected to a portion of said knuckle located more inwardly of the vehicle body than said king pin axis.

18. A suspension system according to claim 15, wherein said resilient means exhibits a resilient force repulsive to the deformation of said link means in a vertical direction, and said link means is adapted to be deformed primarily in the vertical direction.

19. A suspension system according to claim 15, wherein said link means includes a first rod extending substantially vertically, said first rod being connected to said knuckle at a location more inward of the vehicle body than said king pin axis, and said link mechanism including a second rod connected at one end thereof to said first rod and at the other end thereof to at least one of the vehicle body and the lower arm.

20. A suspension system according to claim 15, wherein said resilient means comprises a stabilizer extending laterally of the vehicle body, and a free end of said stabilizer is connected to said link means.

21. A suspension system according to claim 15, wherein said resilient means comprises a damper for damping vertical movement of said knuckle, and said damper has one end thereof connected to said link means.

22. A suspension system according to claim 15, wherein said resilient means comprises a suspension spring having one end thereof connected to said link means.

23. A suspension system according to claim 22, wherein said suspension spring forms an integral part of said link means.

24. A suspension system according to claim 15, wherein said link means includes means for resisting deformation in a horizontal direction, and said resilient means exhibits said resilient repulsive force when said link means is deformed in a vertical direction.

25. A suspension system according to claim 15, wherein a steering mechanism is connected to said knuckle for steering the steered wheel, said link mechanism is mounted to said knuckle and deformed during steering operations of said steering mechanism, a king pin offset of the suspension system is set to a very small value near zero, relative to vertical and said repulsive force of said resilient means applies a restoring torque to the steering mechanism.

26. A suspension system according to claim 15, further including a spring and damper unit having an upper end connected to the vehicle body and a lower end connected to said lower arm.

27. A suspension system according to claim 15, wherein said link means is resiliently deformed to an extent corresponding to said steering operation during said steering operation.

28. A suspension system according to claim 15, wherein said resilient force exhibited by and said restoring torque applied by said resilient means correspond to an extent of deformation of said link means.

* * * * *

UNITED STATES PATENT AND TRADEMARK OFFICE
CERTIFICATE OF CORRECTION

PATENT NO. : 5,496,055
DATED : 05 March 1996
INVENTOR(S) : Yasuji Shibahata, Kiyoshi Nakajima It is certified that error appears in the above-indentified patent and that said Letters Patent is hereby corrected as shown below:

Column 1, line 23, change "engine front" to --engine-front--.
Column 3, line 46, change "de" to --be--.
Column 4, line 51, change "disk I" to --disk 1--;
        line 56, change "$4_{1u}$" to --$4_{1U}$--.
Column 5, line 25, change "$4_{1u}$" to --$4_{1U}$--;
        line 29, change "8" to --$\delta$--.
Column 6, line 14, change "$4_{IU}$" to --$4_{1U}$--;
        line 40, change "$4_{IU}$" to --$4_{1U}$--.
Column 7, line 8, before "steering" insert --a--.
Column 9, line 64, change "illustrates" to --illustrate--.
Column 10, line 6, change "$44_{LI}$" to --$4_{4L1}$--.
 Column 11, line 64, change "illustrate" to --illustrates--;
       line 65, change "the" to --The--.
Column 13, line 18, change "pans" to --parts--.
Column 14, line 8, change "So" to --so--.

Signed and Sealed this

Sixteenth Day of July, 1996

Attest:

BRUCE LEHMAN

Attesting Officer      Commissioner of Patents and Trademarks